United States Patent
Yoshizane et al.

(10) Patent No.: US 7,258,272 B2
(45) Date of Patent: Aug. 21, 2007

(54) IDENTIFICATION SYSTEM USING FACE AUTHENTICATION AND CONSUMER TRANSACTION FACILITY

(75) Inventors: Shigeki Yoshizane, Tokyo (JP); Shinishi Yamazaki, Tokyo (JP); Shigenobu Tsuda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 11/091,378

(22) Filed: Mar. 29, 2005

(65) Prior Publication Data

US 2005/0224573 A1   Oct. 13, 2005

(30) Foreign Application Priority Data

Apr. 9, 2004   (JP) .............................. 2004-114909

(51) Int. Cl.
*G06K 5/00* (2006.01)
(52) U.S. Cl. .................................................. 235/380
(58) Field of Classification Search ................. 235/380
See application file for complete search history.

(56) References Cited

U.S. PATENT DOCUMENTS

| | | | | |
|---|---|---|---|---|
| 4,991,008 A | * | 2/1991 | Nama | 348/150 |
| 5,606,496 A | * | 2/1997 | D'Agostino et al. | 396/235 |
| 6,011,858 A | * | 1/2000 | Stock et al. | 382/115 |
| 6,119,104 A | * | 9/2000 | Brumbelow et al. | 705/35 |
| 2002/0191817 A1 | * | 12/2002 | Sato et al. | 382/118 |
| 2003/0046237 A1 | * | 3/2003 | Uberti | 705/44 |
| 2003/0103652 A1 | * | 6/2003 | Lee et al. | 382/118 |
| 2003/0215114 A1 | * | 11/2003 | Kyle | 382/115 |
| 2004/0260955 A1 | * | 12/2004 | Mantyla | 713/202 |
| 2004/0263621 A1 | * | 12/2004 | Guo et al. | 348/143 |

FOREIGN PATENT DOCUMENTS

JP   2001-256347   9/2001

\* cited by examiner

*Primary Examiner*—Michael G. Lee
*Assistant Examiner*—Tae W. Kim
(74) *Attorney, Agent, or Firm*—Venable LLP; Michael A. Sartori; Kyle D. Petaja

(57) ABSTRACT

This invention provides an identification system using face authentication, in which a system configuration is simple at low cost, a processing speed of authentication is high, resistance to a customer is small, and an effect of preventing irregularities is high. The identification system using face authentication comprises: a counter terminal arranged at a counter of a financial institution and including a camera 13 for obtaining a customer's face image; and a face authentication server 21 connected to the counter terminal and including a face database 21a for storing a registered face data of the customer. In this system, the counter terminal performs face authentication by using face data based on the customer's face image obtained by the camera 13 and using the registered face data of the customer and allows to check with eyes by displaying the registered face data of the customer.

16 Claims, 23 Drawing Sheets

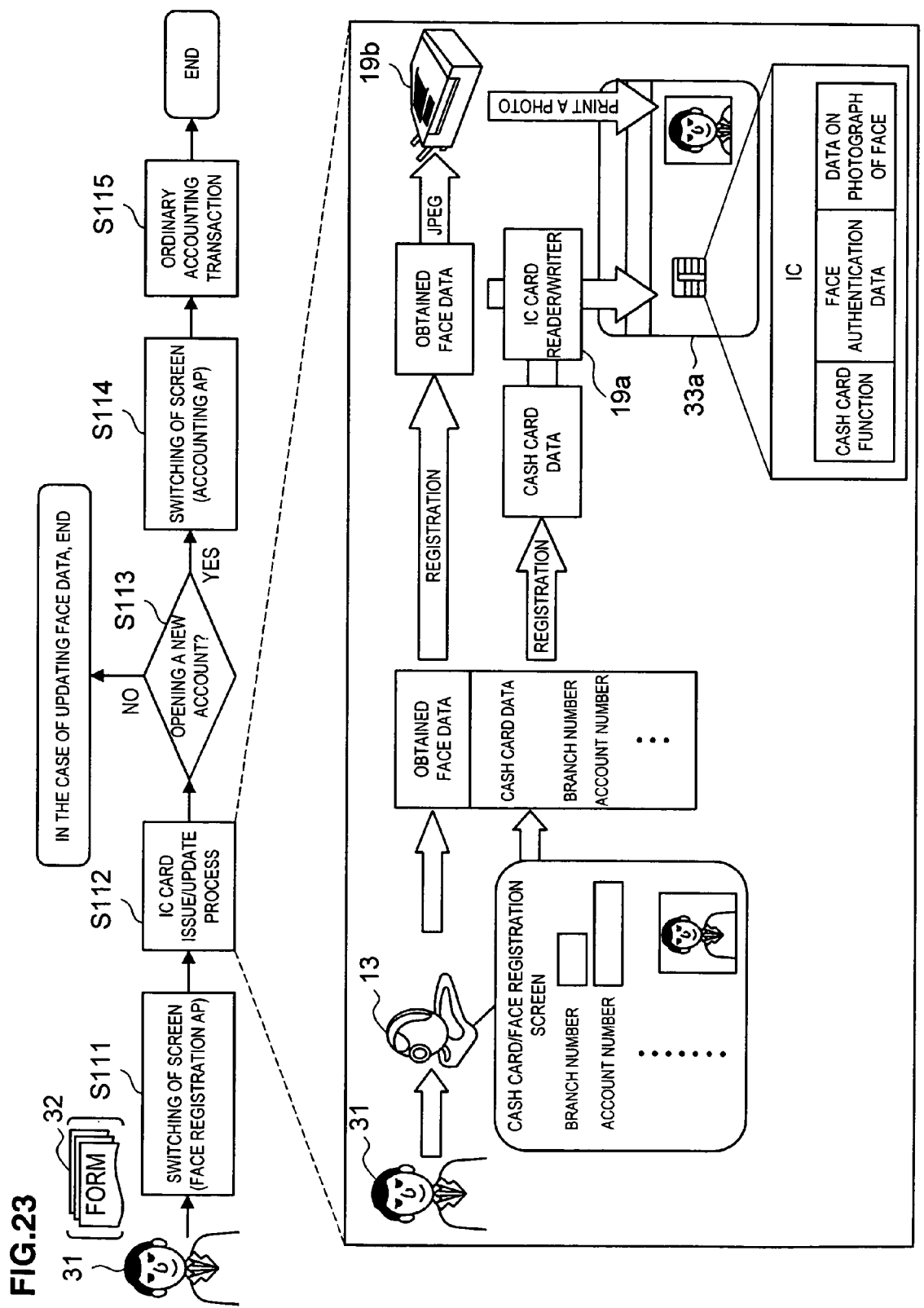

IDENTIFICATION SYSTEM USING FACE AUTHENTICATION AND CONSUMER TRANSACTION FACILITY

CROSS REFERENCE TO RELATED APPLICATIONS

The disclosure of Japanese Patent Application No. JP2004-114909, filed Apr. 9, 2004, entitled "IDENTIFICATION SYSTEM USING FACE AUTHENTICATION AND CONSUMER TRANSACTION FACILITY". The contents of that application are incorporated herein by reference in their entirety.

BACKGROUND OF THE INVENTION

The present invention relates to an identification system using face authentication, and a consumer transaction facility.

DESCRIPTION OF THE RELATED ART

Conventionally, when a customer withdraws deposit by using a passbook or C/D in a financial institution such as bank, credit association and post office and applies the withdrawal by submitting an application with a seal apposed thereto to a counter of office, an imprint of seal apposed to the application and an imprint of a seal registered at the time of opening an account are matched against each other. And when the two imprints are matched against each other, the deposit can be withdrawn (for example, refer to Japanese Patent Laid-open Publication No. 2001-256347).

In the conventional system, however, when a stolen passbook and a seal forged based on a seal apposed to the passbook are used, it is not possible to prevent an illegal withdrawal of deposit properly. For this reason, in recent years, apposition of seal to passbook has been abolished to perform an image process for matching a seal. However, since there are still many customers keeping a passbook and a seal in the same place, it is not possible to prevent an illegal withdrawal of deposit using a stolen passbook and a seal. In addition, although there is taken a measure such as inputting a personal identification number (PIN) at a counter of office, there is no way to cope with the case where a memo or the like with the PIN jotted down is stolen as well as a passbook and a seal.

Even so, in recent years, since the security consciousness to theft or terrorism have increased generally, a customer does not put up a resistance for a biometrics authentication, a way of identification using a biologic feature such as fingerprint, iris and so on, so that there is also proposed to perform the biometrics authentication. Identification of customer using the biometrics authentication makes it possible to prevent an illegal withdrawal of deposit using a stolen passbook and a seal. However, since any biometrics authentications cannot always achieve authentication accuracy at 100%, identification will be left to a human such as a clerk at the counter finally when a question arises on the result of identification using the biometrics authentication.

SUMMARY OF THE INVENTION

An object of the present invention is to provide an identification system using face authentication capable of solving the problems of the conventional system and performing identification by using data for authentication, in which a system configuration is simple at low cost, a processing speed of authentication is high, resistance to a customer is small, and an effect of preventing irregularities is high, by performing face authentication as an identification using a facial appearance as a biologic feature.

In one aspect of the present invention, to achieve this object, an identification system using face authentication according to the present invention comprises: a counter terminal arranged at a counter of a financial institution and including a camera for obtaining a customer's face image; and a face authentication server connected to the counter terminal and including a face database for storing a registered face data of the customer, wherein the counter terminal performs face authentication by using face data based on the customer's face image obtained by the camera and using the registered face data of the customer and allows to check with eyes by displaying the registered face data of the customer.

In another aspect of the present invention, an identification system using face authentication comprises: a consumer transaction facility including a camera for obtaining a customer's face image of a financial institution; a face authentication server connected to the consumer transaction facility and including a face database for storing a registered face data of the customer; and a management terminal connected to the consumer transaction facility and the face authentication server, wherein the consumer transaction facility performs face authentication by using face data based on the customer's face image obtained by the camera and using the registered face data of the customer and allows to check with eyes by displaying the face data based on the customer's face image obtained by the camera and the registered face data of the customer on the management terminal when an identification cannot be performed.

Further in an identification system using face authentication according to another aspect of the present invention, the customer is a holder of an account opened at the financial institution and a registered agent for the holder.

Further in an identification system using face authentication according to another aspect of the present invention, the registered face data of the customer is automatically updated.

Further in an identification system using face authentication according to another aspect of the present invention, the identification system using face authentication comprises an officer terminal operated by an officer of the financial institution and checking with eyes is allowed by displaying the face data based on the customer's face image obtained by the camera on the officer terminal when an identification cannot be performed.

Further in an identification system using face authentication according to another aspect of the present invention, the face database stores security level and face authentication is performed in accordance with the security level.

Further in an identification system using face authentication according to another aspect of the present invention, the counter terminal performs face authentication operating with an accounting application.

Further in an identification system using face authentication according to another aspect of the present invention, the counter terminal performs face authentication operating with a reception terminal.

Further in an identification system using face authentication according to another aspect of the present invention, the registered face data of the customer is stored in an IC card held by the customer.

A consumer transaction facility operated by a customer of a financial institution, according to the present invention, comprises a camera for obtaining a face image of the customer, and wherein the consumer transaction facility is connected to a face authentication server including a face database for storing a registered face data of the customer and to a management terminal; and the consumer transaction facility performs an identification using face authentication by using face data based on the customer's face image obtained by the camera and using the registered face data of the customer and allows to check with eyes by displaying the face data based on the customer's face image obtained by the camera and the registered face data of the customer on the management terminal when an identification cannot be performed.

A face authentication server including a face database for storing a registered face data of the customer of a financial institution, according to the present invention, comprises a camera for obtaining a face image of the customer; and a counter terminal for performing identification using face authentication by using face data based on the customer's face image obtained by the camera and using the registered face data of the customer; or a camera for obtaining a customer's face image; and wherein the face authentication server is connected to a consumer transaction facility for performing identification using face authentication by using face data based on the customer's face image obtained by the camera and using the registered face data of the customer and obtains log data on the identification in the counter terminal or the consumer transaction facility to store in the face database and search.

According to the present invention, face authentication as an identification using a facial appearance as a biologic feature is performed. With this, it becomes possible as well to perform identification by humans by using data for authentication, in which a system configuration is simple at low cost, a processing speed of authentication is high, resistance to a customer is small, and an effect of preventing irregularities is high.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

FIG. 23 is a diagram showing an operation of an identification system using face authentication in the eighth embodiment of the present invention.

DETAILED DESCRIPTION OF THE PREFERRED EMBODIMENTS

Hereinafter, the preferred embodiment of the present invention will be described in reference to the accompanying drawings.

Figure 1:
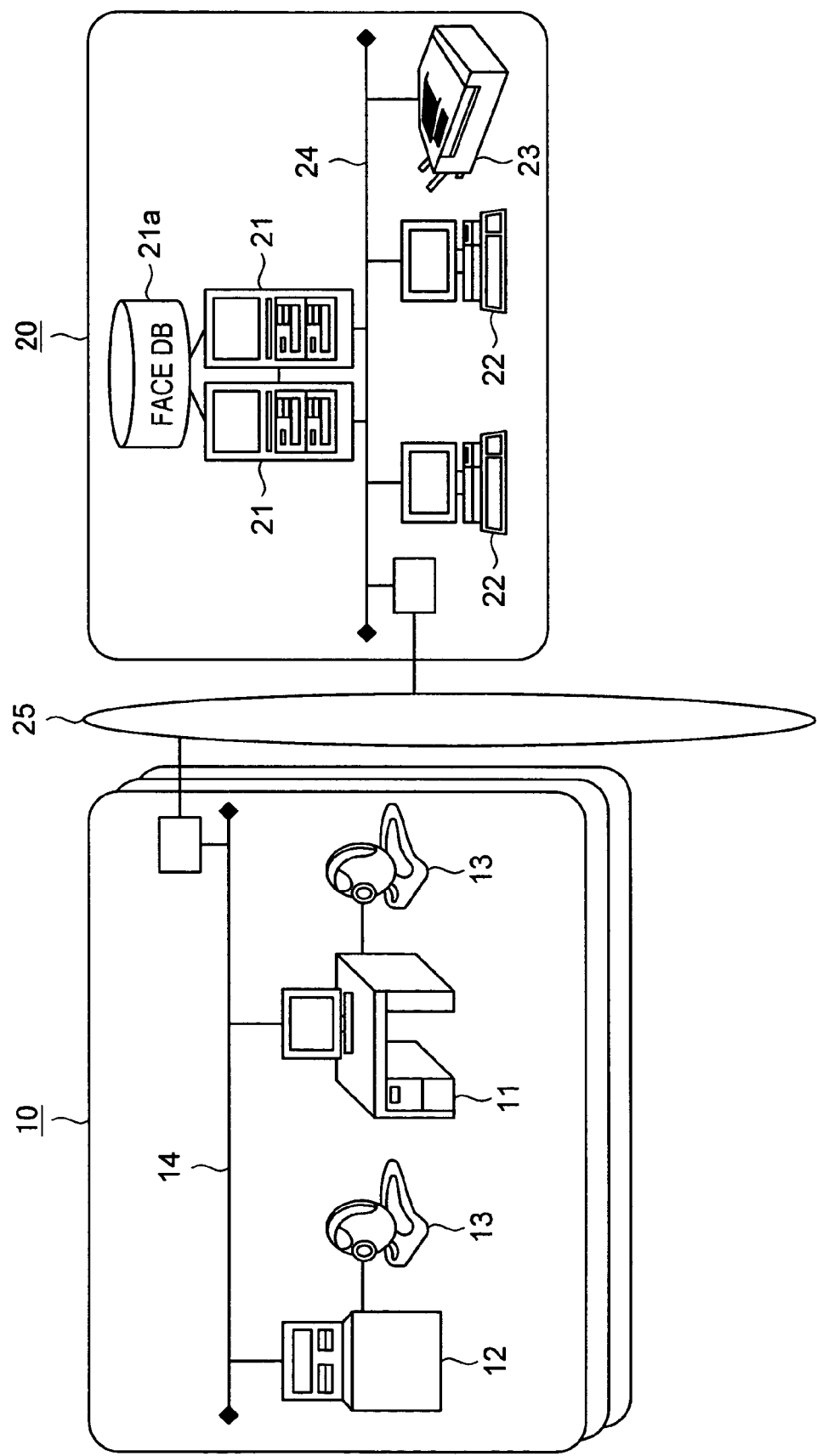
FIG. 1 is a schematic diagram showing a configuration of an identification system using face authentication in the first embodiment of the present invention.
Figure 2:
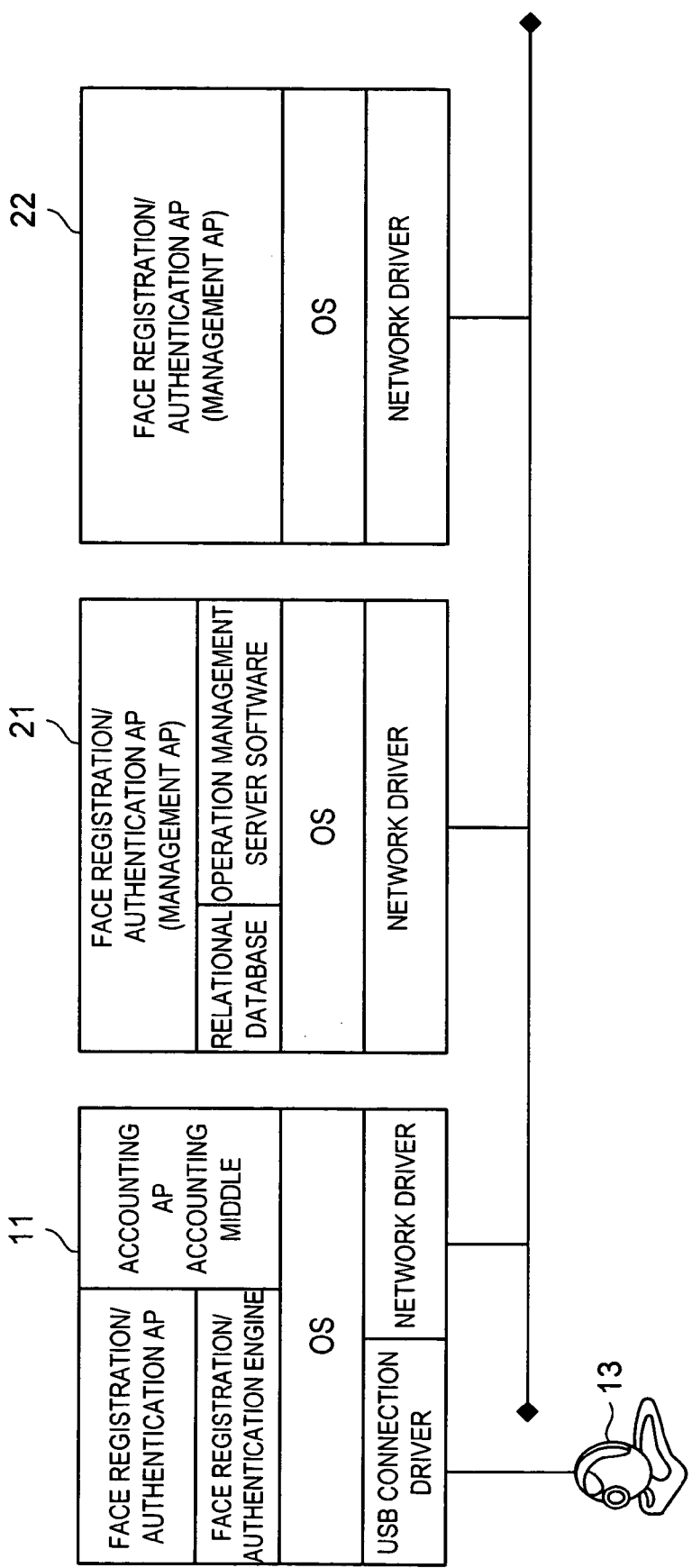
FIG. 2 is a diagram showing a software configuration of an identification system using face authentication in the first embodiment of the present invention.

FIG. 1 is a schematic diagram showing a configuration of an identification system using face authentication in the first embodiment of the present invention. FIG. 2 is a diagram showing a software configuration of an identification system using face authentication in the first embodiment of the present invention.

In FIG. 1, there is comprised by an office 10 indicating head office or branch office of financial institution such as bank, credit association and post office, in which an office terminal 11 as a counter terminal and a consumer transaction facility 12 such as ATM (Automatic Teller Machine), CD (Cash Dispenser) are arranged. The office terminal 11 is a kind of computer arranged at a counter such as a high counter of the office 10 and comprises: an input part including an input device such as keyboard, mouse and touch panel; a display part including a display device such as CRT, liquid crystal display and LED (Light Emitting Diode) display; an operation device such as CPU and MPU; a memory device such as magnetic disk and semiconductor memory; a communications interface; and so on. In addition, a camera 13 for obtaining a face image of a customer 31 to be described later is connected thereto. A clerk at the counter such as Teller in the office 10 performs various services including deposit of cash, a financial process such as withdrawal and transfer, opening a new account, setting of time and savings deposits, issuance of passbook and withdrawal by operating the office terminal 11. Although FIG. 1 shows only one office terminal 11, plural thereof is applicable.

In this embodiment, the clerk at the counter operates the office terminal 11 to perform identification of the customer 31 using face authentications. For this purpose, software to perform an accounting service such as accounting application and accounting middleware, as well as software to perform face registration and face authentication of the customer such as face registration engine, face authentication engine, face registration application, and face authentication application are loaded with the office terminal 11 as shown in FIG. 2. In addition, software such as operating system including Windows® 2000, network driver to connect to a network and USB (Universal Serial Bus) connection driver to connect the camera 13 are loaded with the office terminal 11.

In this case, the face authentication is, for example, face authentication algorithm of Ident Cooperation, U.S., in which an authentication technology called Local Feature Analysis is used. Using this technology, a face image obtained by the camera 13 is processed to extract a plurality of features called node. The feature includes, for example, such a point as an eye. The relational positional relationship between the features, i.e., spatial vector is numerically converted and coded, in which the result of authentication is calculated as a matching ratio.

The consumer transaction facility 12 is a kind of computer comprising: an operation means such as CPU and MPU; a memory means such as magnetic disk and semiconductor memory; a communications interface; cash deposit; and a processing means for performing a financial transaction such as withdrawal organization and transfer. Also, the consumer transaction facility 12 comprises: an input device such as keyboard and touch panel; a display device such as CRT, liquid crystal display and LED display; a voice input system such as microphone for inputting voice of the customer 31; a voice output system such as speaker for audio assist; and so on. In addition, the camera 13 for obtaining a face image of the customer 31 is connected thereto. Although FIG. 1 shows only one consumer transaction facility 12, plural thereof is applicable. Further, software to perform face authentication of the customer 31 such as face authentication engine and face authentication application are loaded with the consumer transaction facility 12.

There is comprised by an intraoffice network 14 such as intranet and LAN (Local Area Network) established in the office 10, and the office terminal 11 and the consumer transaction facility 12 are connected thereto. The intraoffice network 14 is connected to a network 25 through a router and so on. The network 25 may have any form of communication line network including wired or wireless public network, leased line network, Internet, intranet, LAN, WAN (Wide Area Network), VPN (Virtual Private Network), satellite communication channel and so on, or may be formed by combining these properly.

In addition, there is comprised by a center 20 for performing identification in a financial institution, in which a face authentication server 21, a management terminal 22 and a printer 23 are arranged. The face authentication server 21 comprises: an operation means such as CPU and MPU; a memory means such as magnetic disk and semiconductor memory; a communications interface; and so on and performs an operation in accordance with a program to perform identification of the customer 31. In addition, the face authentication server 21 may be configured by a single computer such as mainframe computer, may be configured by combining organically a plurality of computers such as distributed server or may be one of a plurality of systems established in a large-scale computer. A face database 21a for storing various data necessary for face authentication such as face data registered is connected to the face authentication server 21. The face database 21a may be incorporated in the face authentication server 21. The face data includes the face image and data for face authentication such as feature, which are stored in correspondence with branch number and account number. Log data is also stored in the face authentication server 21. The log data includes transaction time, branch number, terminal number, transaction contents, account number, authentication result, face data and so on.

Software such as relational database including Oracle® and operation management server software, as well as software to perform face registration and face authentication of the customer 31 such as face registration application, face authentication application and management application are loaded with the face authentication server 21 as shown in FIG. 2. In addition, software such as operating system including Windows® 2000Server and network driver to connect to a network are also loaded with the face authentication server 21.

The management terminal 22 is a kind of computer operated by a clerk at the center 20 and comprises: an input part including an input device such as keyboard, mouse and touch panel; a display part including a display device such as CRT, liquid crystal display and LED display; an operation device such as CPU and MPU; a memory device such as magnetic disk and semiconductor memory; a communications interface; and so on. The clerk at the center 20 operates the management terminal 22 to perform identification of the customer 31 operating the consumer transaction facility 12. For this purpose, software to perform face registration and face authentication of the customer 31 such as face registration application, face authentication application and management application are loaded with the management terminal 22 as shown in FIG. 2. In addition, software such as operating system including Windows® 2000 and network driver to connect to a network are also loaded with the management terminal 22.

The printer 23 may adopt any kind of printing method as long as being capable of printing such a medium as printing paper, for example, ink-jet, electrophotographic method, thermal transfer method, wire dot-matrix printing and so on are applicable. The printer 23 is used for outputting log data stored in the face database 21a and other purposes.

Also, there is comprised by an intracenter network 24 such as intranet and LAN established in the center 20, to which the face authentication server 21, the management terminal 22 and the printer 23 are connected. The intracenter network 24 is connected to the network 25 through a router and so on. Thereby the face authentication server 21 and the management terminal 22 can perform communication with the office terminal 11 arranged at the office 10 and with the consumer transaction facility 12.

In this embodiment, when a customer 31 opens a new account in a financial institution, the camera 13 connected to the office terminal 11 obtains a face image by photographing the customer's face to register face data and store in the face database 21a. Then a card-issuing machine (not shown) arranged at the office 10 issues a card with the registered face image printed and the card is handed to the customer 31. In addition, since a human facial appearance changes gradually with times, it is preferable for the registered face data to be updated at a specific period so as to prevent the matching ratio in face authentication from deteriorating with secular change. The period can be set optionally, for example, every transaction time, every year and so on. Further, it is preferable for the card with the face image printed to be reissued every time the registered face data is updated.

When the customer 31 performs a transaction such as withdrawal, account closure and notification including address change at the counter of office 10, the clerk at the counter operates the office terminal 11 to input an account number and so on. Then face data stored in the face database 21a is searched based on the branch number and the account number and the searched face data is sent to the office terminal 11. Thereby the office terminal 11 performs face authentication by using face data based on the face image of the customer 31 obtained by the camera 13 and the face data searched. As required, the face image included in the searched face data is displayed on the display part of the office terminal 11, which enables the clerk at the counter to perform identification of the customer 31 with eyes.

When the customer 31 operates the consumer transaction facility 12 to perform transaction such as withdrawal and transfer, the face image of the customer obtained by the camera 13 is sent to the face authentication server 21 along with the branch number and the account number. Then face data stored in the face database 21a is searched based on the branch number and the account number and the searched face data is sent to the consumer transaction facility 12. Thereby the consumer transaction facility 12 performs face authentication by using face data based on the face image of the customer 31 obtained by the camera 13 and the face data searched. As required, the face image included in the searched face data is displayed on the display part of the management terminal 22, which enables the clerk at the center 20 to perform identification of the customer 31 with eyes.

Next, the operation of the identification system using face authentication with the above configuration will be described. First, there will be described the operation in the case of opening a new account by a customer or updating face data.

Figure 3:
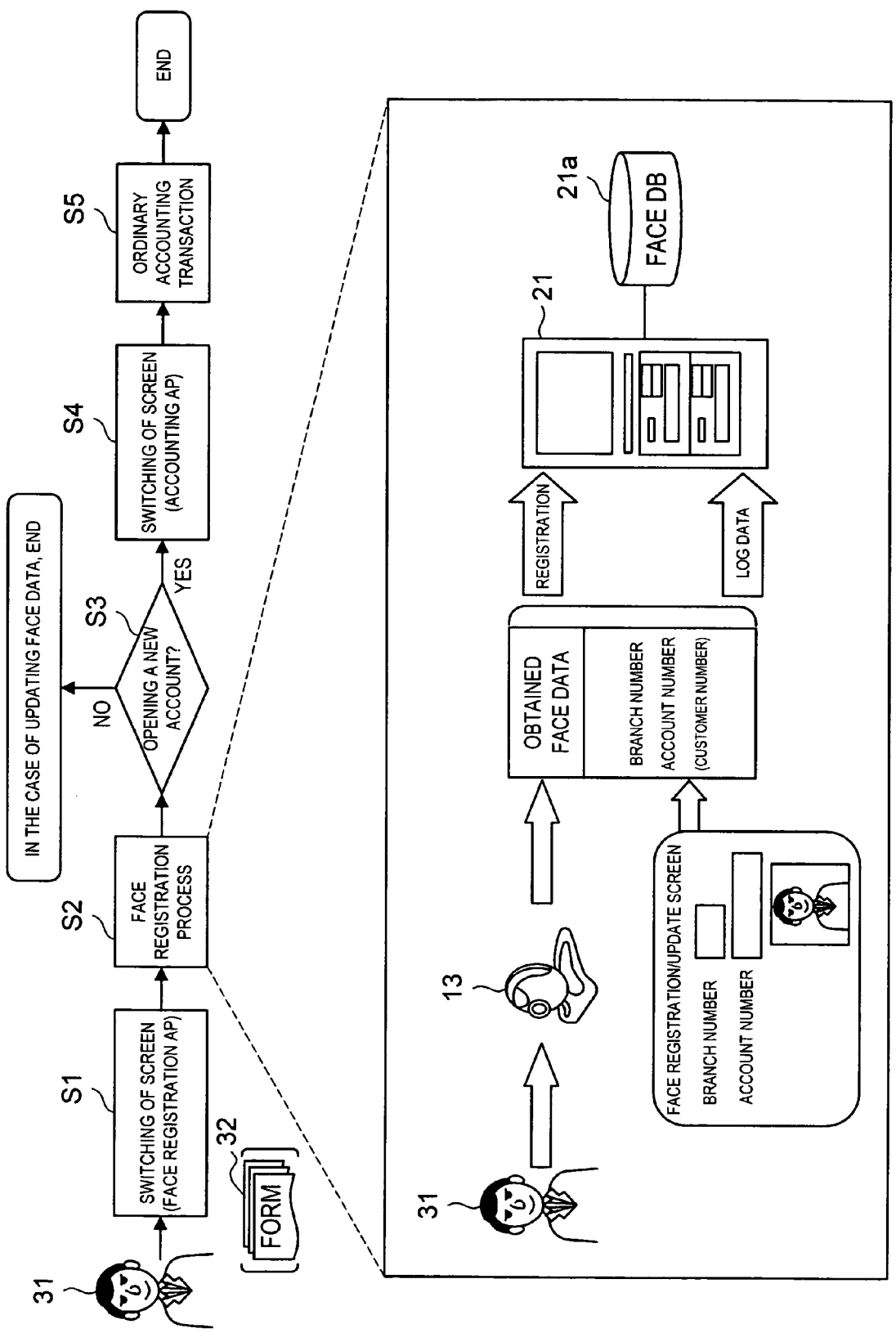
FIG. 3 is a first diagram showing an operation of an identification system using face authentication in the first embodiment of the present invention.

FIG. 3 is a first diagram showing an operation of an identification system using face authentication in the first embodiment of the present invention.

In FIG. 3, there is comprised by the customer 31 and a form 32 to be submitted to the counter at the office 10 with necessary information filled. First, the customer 31 submits the form 32 with necessary information filled to apply for opening a new account. Then the clerk at the counter operates the office terminal 11 to start up the face registration application and a screen displayed on the display part of the office terminal 11 is switched to perform face registration process.

In the face registration process, the face of the customer 31 is photographed by the camera 13 connected to the office terminal 11 to obtain a face image. The clerk at the counter inputs the branch number and the account number in the columns of branch number and account number in a face registration/update screen displayed on the display part of the office terminal 11. A customer number may also be input. Then the face data based on the obtained face image, i.e., the obtained face data is correlated to the branch number and the account number or the customer number and registered by the face authentication server 21 to be stored in the face database 21a. The log data is also stored in the face database 21a. The face authentication server 21 has a function of searching the log data and searches the log data as required. Note that one customer 31 is registered for one account, and the face data on one customer 31 includes a plurality of face images.

Next, it is judged whether the transaction at this time is opening a new account or updating face data. In the case of updating face data, the process ends. In the case of opening a new account, the accounting application starts to perform switching of the screen displayed on the display part of the office terminal 11, and after an ordinary accounting transaction, the process ends.

Next, steps in FIG. 3 will be described.

Step S1 The face registration application starts to perform switching of the screen displayed on the display part of the office terminal 11.

Step S2 The face registration process is performed.

Step S3 It is judged whether the transaction at this time is opening a new account or updating face data. In the case of opening a new account, there proceeds on to step S4 and in the case of updating face data, the process ends.

Step S4 The accounting application starts to perform switching of the screen displayed on the display part of the office terminal 11.

Step S5 An ordinary accounting transaction is performed and the process ends.

Next, there will be described the case where the customer 31 performs a transaction such as withdrawal, account closure and notification including address change at the counter of office 10.

Figure 4:
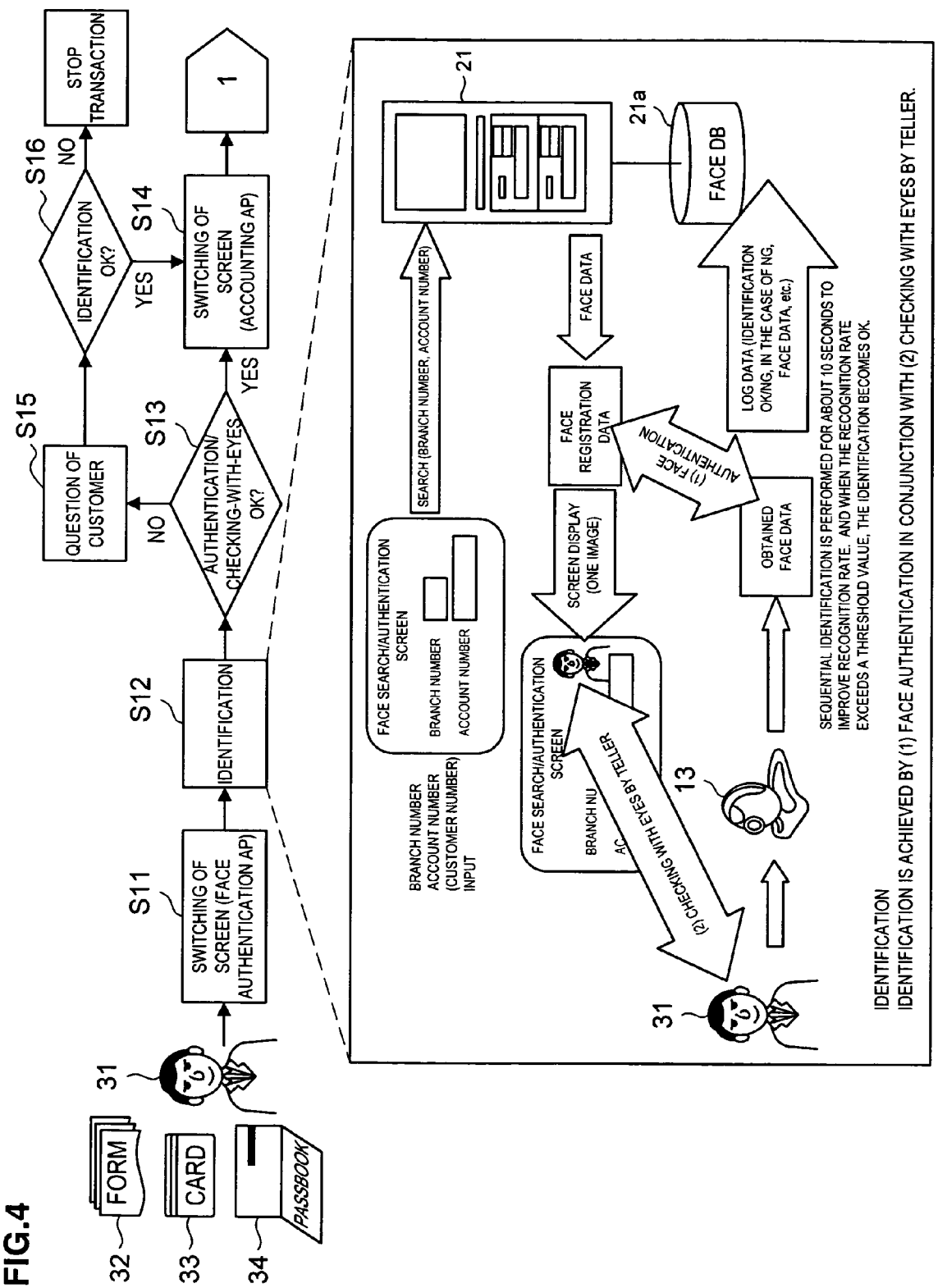
FIG. 4 is a second diagram showing an operation of an identification system using face authentication in the first embodiment of the present invention.
Figure 5:
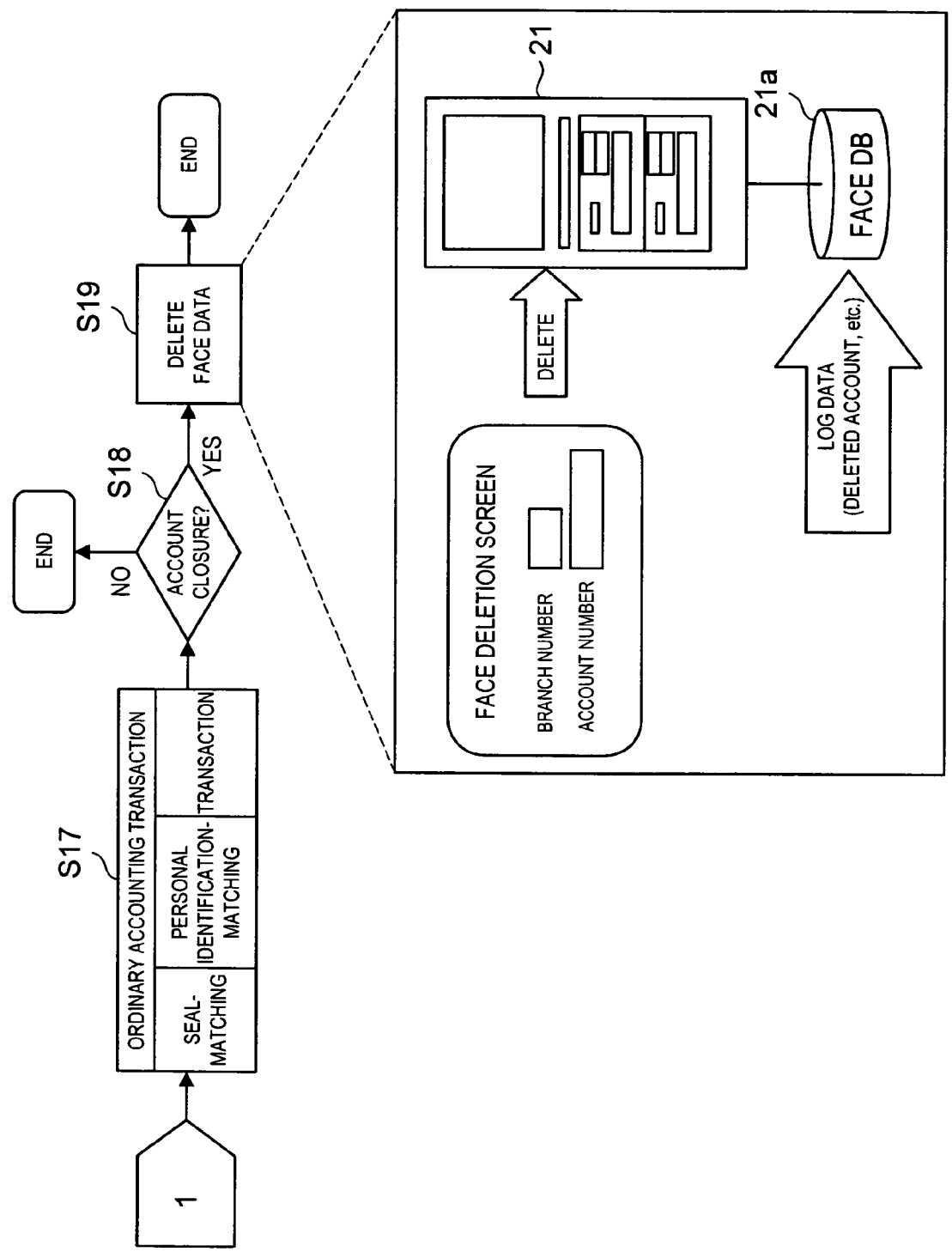
FIG. 5 is a third diagram showing an operation of an identification system using face authentication in the first embodiment of the present invention.

FIG. 4 is a second diagram showing an operation of an identification system using face authentication in the first embodiment of the present invention. FIG. 5 is a third diagram showing an operation of an identification system using face authentication in the first embodiment of the present invention.

In FIG. 4, there is comprised by a card 33 of the customer 31 and a passbook 34 of the customer 31. First, the customer 31 submits the form 32 with necessary information filled, the card 33 and the passbook 34 to the counter to request a transaction. Then the clerk at the counter operates the office terminal 11 to start up the face authentication application and a screen displayed on the display part of the office terminal 11 is switched to perform identification.

In the identification, the clerk at the counter inputs the branch number and the account number in the columns of branch number and account number in a face search/authentication screen displayed on the display part of the office terminal 11. A customer number may also be input. Then the face data stored in the face database 21a is searched based on the branch number and the account number or the customer number and the searched face data is sent to the office terminal 11, which performs (1) face authentication by using the face data based on the face image of the customer 31 obtained by the camera 13, i.e., the obtained face data and the searched face data, i.e., the face registration data. In this case, sequential identification is performed for about 10 seconds to improve recognition rate. And when the recognition rate exceeds a threshold value, the identification becomes OK. One face image included in the face registration data is displayed on the face search/authentication screen displayed on the display part of the office terminal 11 and the clerk at the counter performs identification of the customer 31 with eyes. In other words, (2) checking with eyes by teller is performed. In this embodiment, the identification is achieved by (1) face authentication in conjunction with (2) checking with eyes by teller. The log data is stored in the face database 21*a* and includes identification OK or NG, and in the case of NG, includes face data as well.

Sequentially, it is judged whether the identification has been achieved by face authentication and checking with eyes or not, in other words, authentication/checking-with-eyes is OK or not. In the case of not being OK, the clerk at the counter asks a question of the customer 31 to identify an agent. The clerk at the counter inputs to the office terminal 11 whether the identification is OK or not. Then it is judged whether the identification is OK or not, and in the case of not being OK, the transaction is stopped. In the case of OK, and authentication/checking-with-eyes being OK, on the other hand, the accounting application starts and a screen displayed on the display part of the office terminal 11 is switched to perform an ordinary accounting transaction. In the accounting transaction, as heretofore, the transaction is performed after such a checking as matching a seal and personal identification checking including checking a personal identification number.

Next, it is judged whether the transaction at this time is account closure or not, and in the case of not being account closure, the transaction ends. In the case of account closure, the face data is deleted. In this deletion, the clerk at the counter inputs the branch number and the account number in the columns of branch number and account number in a face deletion screen displayed on the display part of the office terminal 11. Then the face data stored in the face database 21*a* is deleted based on the branch number and the account number by the face authentication server 21. The log data is stored in the face database 21*a* and includes the data on the deleted account, which is searched by the face authentication server 21 as required. After the face data deletion, the transaction ends.

Next, steps in FIGS. 4 and 5 will be described.

Step S11 The face authentication application starts to perform switching of the screen displayed on the display part of the office terminal 11.

Step S12 The identification is performed.

Step S13 It is judged whether authentication/checking-with-eyes is OK or not. In the case of authentication/checking-with-eyes being OK, there proceeds on to step S14 and in the case of authentication/checking-with-eyes not being OK, there proceeds on to step S15.

Step S14 The accounting application starts to perform switching of the screen displayed on the display part of the office terminal 11.

Step S15 A question is asked of the customer 31 to identify an agent.

Step S16 It is judged whether the identification is OK or not, and in the case of OK, there goes back to step S14. In the case of not being OK, the transaction is stopped.

Step S17 An ordinary accounting transaction is performed.

Step S18 It is judged whether the transaction at this time is account closure or not, and in the case of account closure, there proceeds on to step S19. In the case of not being account closure, the transaction ends.

Step S19 The face data is deleted to finish the process.

Next, the case where the customer 31 operates the consumer transaction facility 12 to perform transaction such as withdrawal and transfer will be described.

Figure 6:
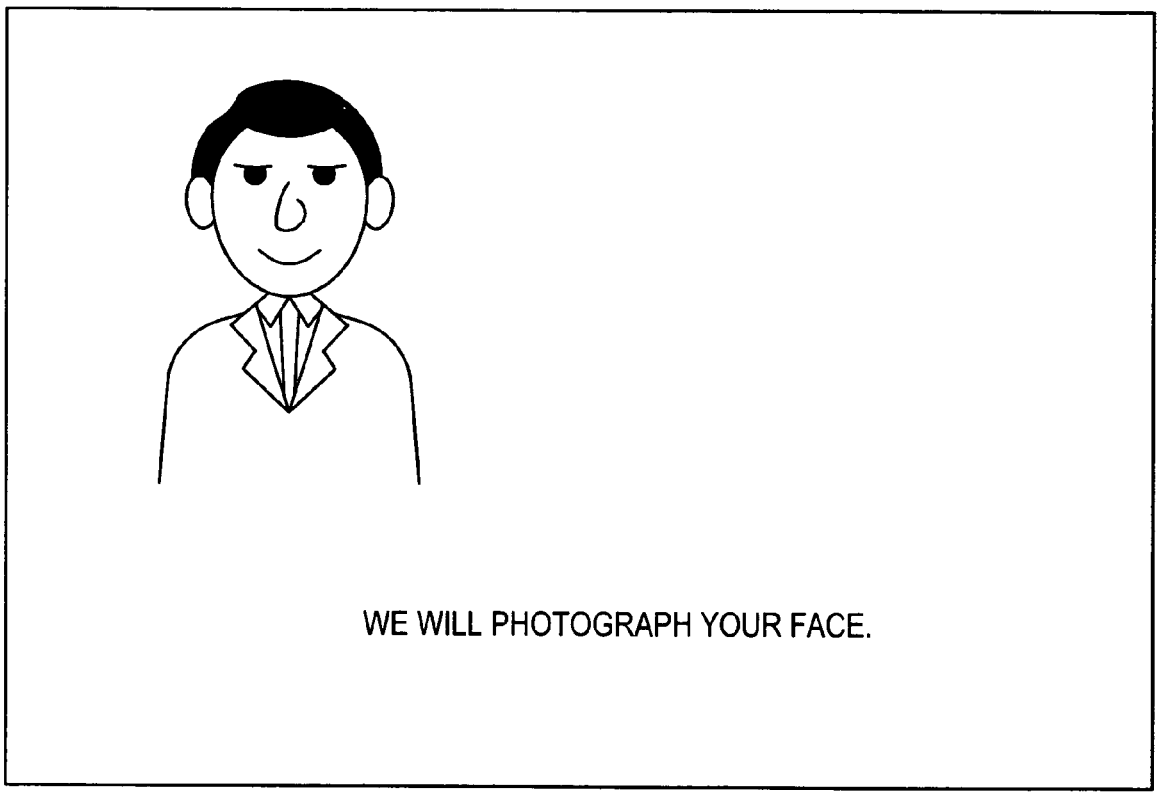
FIG. 6 is a diagram showing a screen displayed on a customer operation part of a consumer transaction facility in the first embodiment of the present invention.
Figure 7:
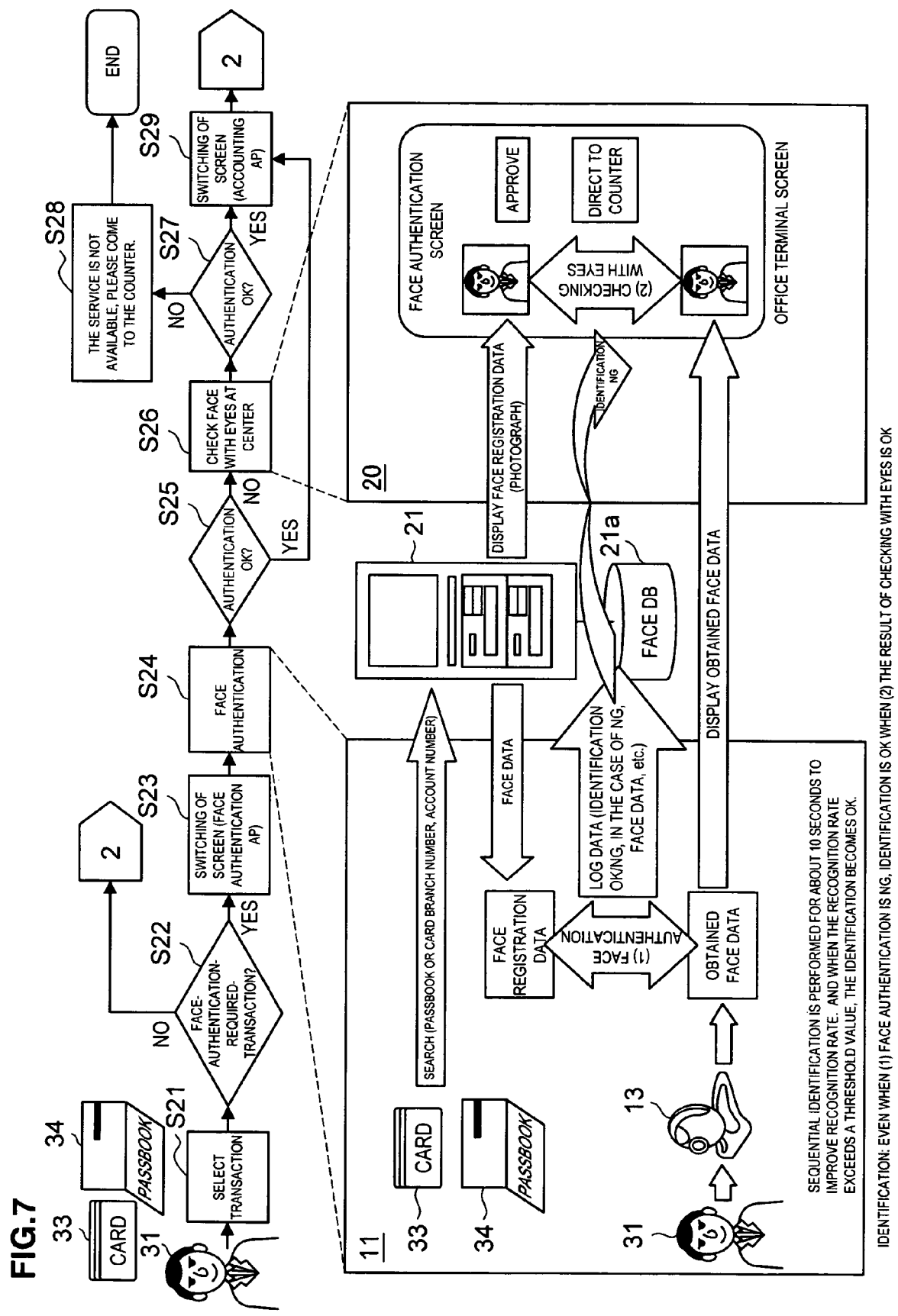
FIG. 7 is a fourth diagram showing an operation of an identification system using face authentication in the first embodiment of the present invention.
Figure 8:
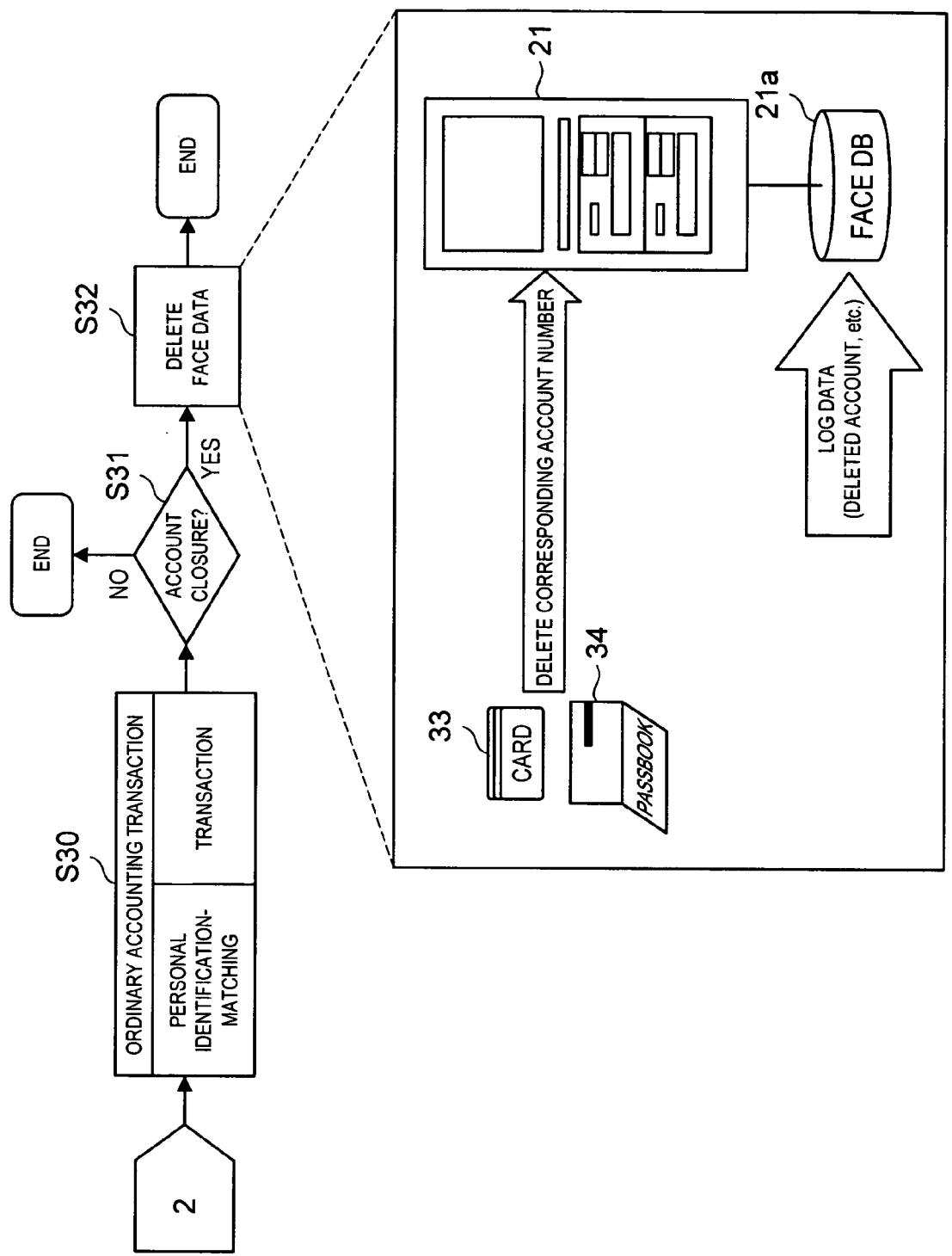
FIG. 8 is a fifth diagram showing an operation of an identification system using face authentication in the first embodiment of the present invention.

FIG. 6 is a diagram showing a screen displayed on a customer operation part of a consumer transaction facility in the first embodiment of the present invention. FIG. 7 is a fourth diagram showing an operation of an identification system using face authentication in the first embodiment of the present invention. FIG. 8 is a fifth diagram showing an operation of an identification system using face authentication in the first embodiment of the present invention.

First, the customer 31 operates the consumer transaction facility 12 by using the card 33 and the passbook 34 to select a transaction such as withdrawal and transfer. With this operation, it is judged whether the selected transaction is a transaction requiring face authentication or not, in other words, a face-authentication-required-transaction or not. In the case of not being a face-authentication-required-transaction, in other words, the transaction does not require face authentication, an ordinary accounting transaction is performed. This kind of transaction includes deposit, which is a transaction without requirement of identification. In the case of a face-authentication-required-transaction, the face authentication application starts to perform switching of the screen displayed on the customer operation part of the consumer transaction facility 12 to perform face authentication. In this case, after a message "We will photograph your face." is displayed on the customer operation part of the consumer transaction facility 12 as shown in FIG. 6, the camera obtains the face image of the customer 31.

In the face authentication, the branch number and the account number read out from the magnetic stripes of the card 33 and passbook 34 are sent to the face authentication server 21. Then the face data stored in the face database 21*a* is searched based on the branch number and the account number or the customer number and the searched face data is sent to the consumer transaction facility 12, which performs (1) face authentication by using the face data based on the face image of the customer 31 obtained by the camera 13, i.e., the obtained face data and the searched face data, i.e., the face registration data. In this case, sequential identification is performed for about 10 seconds to improve recognition rate. The log data is stored in the face database 21*a* and includes identification OK or NG, and in the case of NG, includes face data as well. The face data is searched by the face authentication server 21 as required.

Sequentially, it is judged whether the identification has been achieved by face authentication or not, in other words, authentication is OK or not. In the case of not being OK, the face is checked with eyes at the center 20. In this case, the face image included in the face registration data and the face image included in the obtained face data are sent to the management terminal 22 and displayed on the face authentication screen of the display part of the management terminal 22. The clerk at the center 20 checks with eyes to perform identification of the customer 31, i.e., (2) checking with eyes is performed. The clerk at the center 20 inputs to the management terminal 22 whether the result of the check is OK or not. The result of the check is notified to the consumer transaction facility 12.

And sequentially, it is judged whether the identification has been achieved by checking with eyes or not, in other words, identification is OK or not. In the case of not being OK, a message "The service is not available, please come to the counter." is displayed on the customer operation part of the consumer transaction facility 12, and the transaction ends. In the case of identification and authentication being OK, the accounting application starts to perform switching of the screen displayed on the customer operation part of the consumer transaction facility 12 to perform an ordinary accounting transaction. In the accounting transaction, as heretofore, the transaction is performed after such a checking as personal identification checking.

Next, it is judged whether the transaction at this time is account closure or not, and in the case of not being account closure, the transaction ends. In the case of account closure, the face data is deleted. In this deletion, the branch number and the account number read out from the magnetic tapes of the card 33 and passbook 34 are sent to the face authentication server 21. Then the face data stored in the face database 21a is deleted based on the branch number and the account number. The log data is stored in the face database 21a and includes the data on the deleted account. After the face data deletion, the transaction ends.

Next, steps in FIGS. 7 and 8 will be described.

Step S21 Transaction is selected.

Step S22 It is judged whether the selected transaction is a face-authentication-required-transaction or not. In the case of face-authentication-required-transaction, there proceeds on to step S23 and in the case of not being face-authentication-required-transaction, there proceeds on to step S30.

Step S23 The face authentication application starts to perform switching of the screen displayed on the customer operation part of the consumer transaction facility 12.

Step S24 Face authentication is performed.

Step S25 It is judged whether the authentication is OK or not, and in the case of OK, there proceeds on to step S29. In the case of not being OK, there proceeds on to step S26.

Step S26 The face is checked with eyes at the center 20.

Step S27 It is judged whether the identification is OK or not. In the case of OK, there proceeds on to step S29. In the case of not being OK, there proceeds on to step S28.

Step S28 A message "The service is not available, please come to the counter." is displayed on the customer operation part of the consumer transaction facility 12, and the transaction ends.

Step S29 The accounting application starts to perform switching of the screen displayed on the customer operation part of the consumer transaction facility 12.

Step S30 An ordinary accounting transaction is performed.

Step S31 It is judged whether the transaction at this time is account closure or not, and in the case of account closure, there proceeds on to step S32. In the case of not being account closure, the transaction ends.

Step S32 The face data is deleted to finish the process.

In this embodiment, as described above, the face data based on the face image of the customer 31 obtained at the time of opening an account is registered and stored in the face database 21a. And when the customer 31 performs a transaction at the counter of the office 10, face authentication is performed by using the face data based on the face image of the customer 31 obtained by the camera 13 during the transaction and by using the registered face data and the clerk at the counter checks with eyes by comparing the face image included in the registered face data with the customer 31, thereby the identification of the customer 31 is performed. When the customer 31 performs a transaction by operating the consumer transaction facility 12, face authentication is performed by using the face data based on the face image of the customer 31 obtained by the camera 13 during the transaction and by using the registered face data. In the case where the identification is not achieved, the clerk at the center 20 checks with eyes by comparing the face data based on the face image of the customer 31 obtained by the camera 13 during the transaction with the registered face data, thereby the identification of the customer 31 is performed.

With this process, since identification can be achieved reliably by checking with eyes even with low authentication accuracy for face authentication, the system configuration can be made simple and the cost can be reduced. Also, high speed of authentication process eliminates the necessity for the customer 31 to wait for a long time and customer service deterioration, and moreover, makes the customer 31 feel less inhibited like fingerprinting and so on. Further, since a person trying to commit an irregularity feels resistance for his/her face to be photographed, an effect of preventing irregularities is high. Also, the face image of the person who committed an irregularity is stored as log data, which exhibits a high value of evidence. The face data for authentication is used for checking with eyes for identification, which reduces the amount of data.

Next, the second embodiment of the present invention will be described in reference to the accompanying drawings. The same reference numerals as in the first embodiment are attached to components having the same functions in following description and the accompanying drawings, and a description thereof is omitted.

Figure 9:
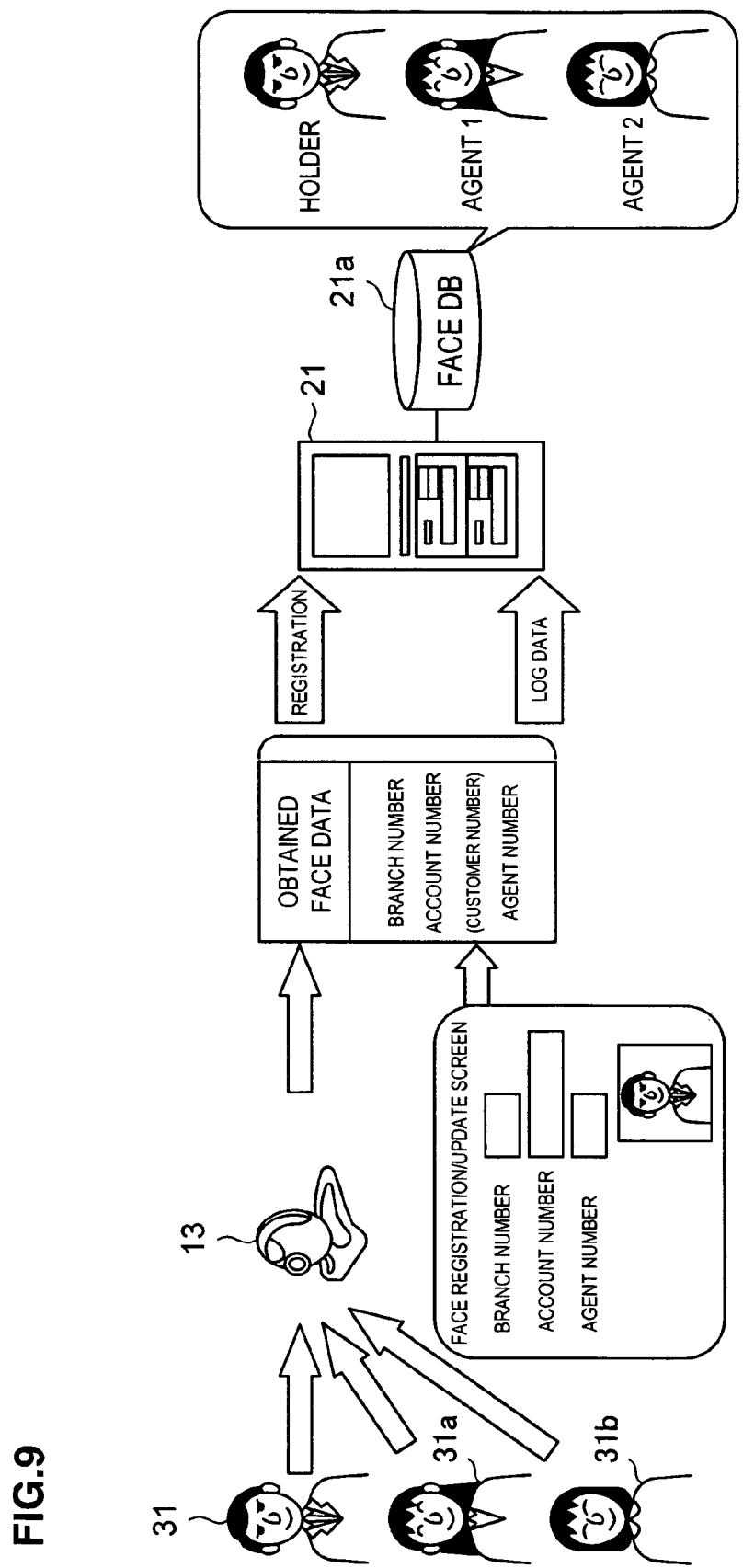
FIG. 9 is a first diagram showing an operation of an identification system using face authentication in the second embodiment of the present invention.
Figure 10:
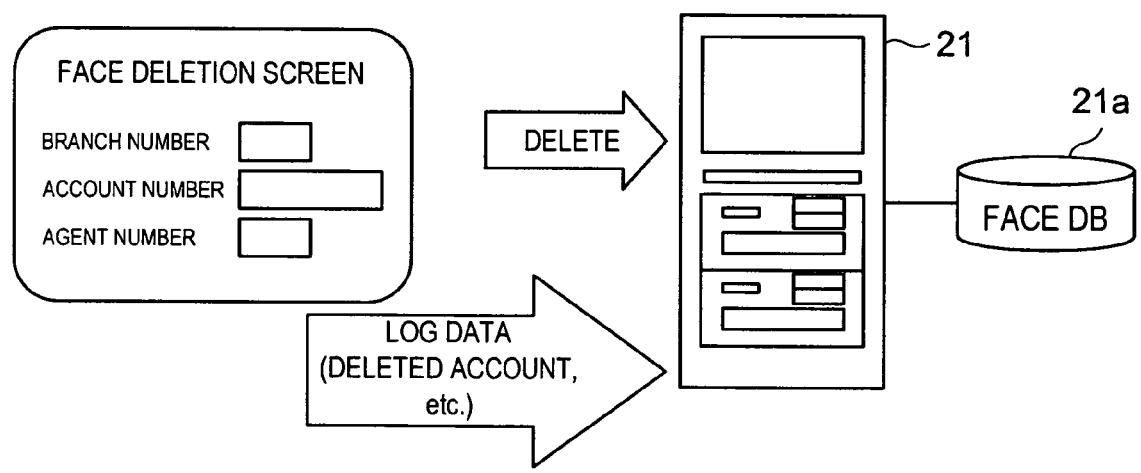
FIG. 10 is a second diagram showing an operation of an identification system using face authentication in the second embodiment of the present invention.

FIG. 9 is a first diagram showing an operation of an identification system using face authentication in the second embodiment of the present invention. FIG. 10 is a second diagram showing an operation of an identification system using face authentication in the second embodiment of the present invention.

In this embodiment, face data on an agent for the customer 31 can be registered as well as the face data on the customer 31. Thereby a spouse, a family member and so on of the customer 31 can perform transaction by using the account of the customer 31 as an agent for the customer 31.

In FIG. 9, there is comprised by a first agent 31a for the customer 31 and a second agent 31b for the customer 31. It is possible to set the number of agent who can be registered for one customer 31 appropriately. When the customer 31 opens a new account at a financial institution or the face data is updated, the first agent 31a and the second agent 31b can be registered. In the face registration process, the camera 13 connected to the office terminal 11 obtains the face images of the customer 31, the first agent 31a and second agent 31b by photographing their faces. The clerk at the counter inputs the branch number, the account number and an agent number in the columns of branch number, account number and agent number in a face registration/update screen displayed on the display part of the office terminal 11. In this case, the face registration/update screen including face image is displayed for each of the customer 31, the first agent 31a and the second agent 31b. A customer number may also be input.

Then the face data based on the obtained face image, i.e., the obtained face data is correlated to the branch number, the account number or the customer number and the agent number and registered by the face authentication server 21 to be stored in the face database 21a. The log data is also stored in the face database 21a. Thereby the customer 31 as a holder, the first agent 31a as an agent 1 and the second agent 31b as an agent 2 are registered for one account, in other words, plural persons are registered for one account.

When closing an account or removing an agent, the clerk at the counter inputs the branch number, the account number and the agent number in the columns of branch number, account number and agent number in a face deletion screen displayed on the display part of the office terminal 11 as shown in FIG. 10. Then the face data stored in the face database 21a is deleted based on the branch number, the account number and the agent number. When the agent number is not input, that is, when there is no section for an agent, all face data corresponding to the account is deleted. When the agent number is input, that is, when there is a section for an agent, only face data on the corresponding agent is deleted. The log data is stored in the face database 21a and includes the data on the deleted account.

With regard to operations in the case where the customer 31 performs a transaction such as withdrawal, account closure and notification including address change at the counter of office 10 and where the customer 31 operates the consumer transaction facility 12 to perform transaction such as withdrawal and transfer, since the operations are the same as in the first embodiment other than inputting an agent number at the time of transaction, the description thereof will be omitted.

In this embodiment, as described above, face data on the first agent 31a and second agent 31b for the customer 31 can be registered as well as the face data on the customer 31. Thereby a spouse, a family member and so on of the customer 31 can be subjected to identification using face authentication and perform transaction by using the account of the customer 31 as the first agent 31a and the second agent 31b for the customer 31.

Next, the third embodiment of the present invention will be described in reference to the accompanying drawings. The same reference numerals as in the first and second embodiments are attached to components having the same functions in following description and the accompanying drawings, and a description thereof is omitted.

Figure 11:
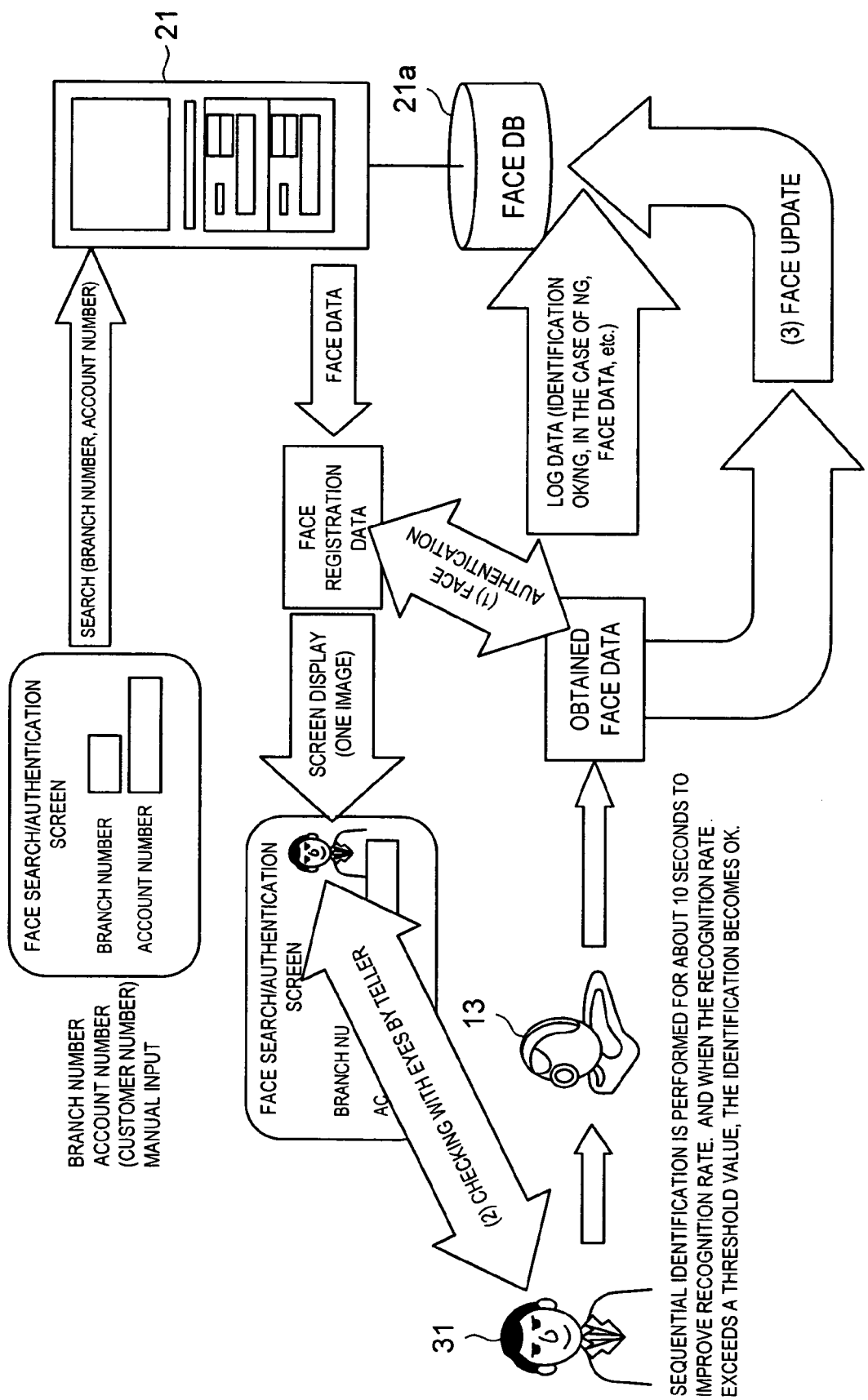
FIG. 11 is a diagram showing an operation of an identification system using face authentication in the third embodiment of the present invention.

FIG. 11 is a diagram showing an operation of an identification system using face authentication in the third embodiment of the present invention.

In this embodiment, when the customer 31 performs a transaction such as withdrawal, account closure and notification including address change at the counter of office 10, the face data on the customer 31 is automatically updated. In the identification, as shown in FIG. 11, the clerk at the counter inputs manually the branch number and the account number in the columns of branch number and account number in a face search/authentication screen displayed on the display part of the office terminal 11. A customer number may also be input. Then the face data stored in the face database 21a is searched based on the branch number and the account number or the customer number and the searched face data is sent to the office terminal 11, which performs (1) face authentication by using the face data based on the face image of the customer 31 obtained by the camera 13, i.e., the obtained face data and the searched face data, i.e., the face registration data. In this case, sequential identification is performed for about 10 seconds to improve recognition rate. And when the recognition rate exceeds a threshold value, the identification becomes OK.

One face image included in the face registration data is displayed on the face search/authentication screen displayed on the display part of the office terminal 11 and the clerk at the counter performs identification of the customer 31 with eyes. In other words, (2) checking with eyes by teller is performed. In this embodiment, the identification is achieved by (1) face authentication in conjunction with (2) checking with eyes by teller. The log data is stored in the face database 21a and includes identification OK or NG, and in the case of NG, includes face data as well.

Further, the face registration data is updated by the obtained face data, in other words, face update is performed. Thereby the registered face data stored in the face database 21a is updated. There may be several patterns of the timing at which the face data is updated. For example: update may always be available whenever (1) the result of face authentication falls within identification OK; update may always be available whenever fulfilling both the cases (1) the result of face authentication falls within identification OK and (2) the result of checking with eyes by teller is OK; or update may always be available whenever fulfilling both the cases (1) the result of face authentication falls within identification NG and (2) the result of checking with eyes by teller is OK.

In this embodiment, as described above, when the customer 31 performs a transaction such as withdrawal, account closure and notification including address change at the counter of office 10, the face data on the customer 31 is automatically updated. For this reason, it is possible to prevent the matching ratio in face authentication from deteriorating with secular change. When the customer 31 operates the consumer transaction facility 12 to perform transaction such as withdrawal and transfer, the face data on the customer 31 may be updated automatically.

Next, the fourth embodiment of the present invention will be described in reference to the accompanying drawings. The same reference numerals as in the first to third embodiments are attached to components having the same functions in following description and the accompanying drawings, and a description thereof is omitted.

Figure 12:
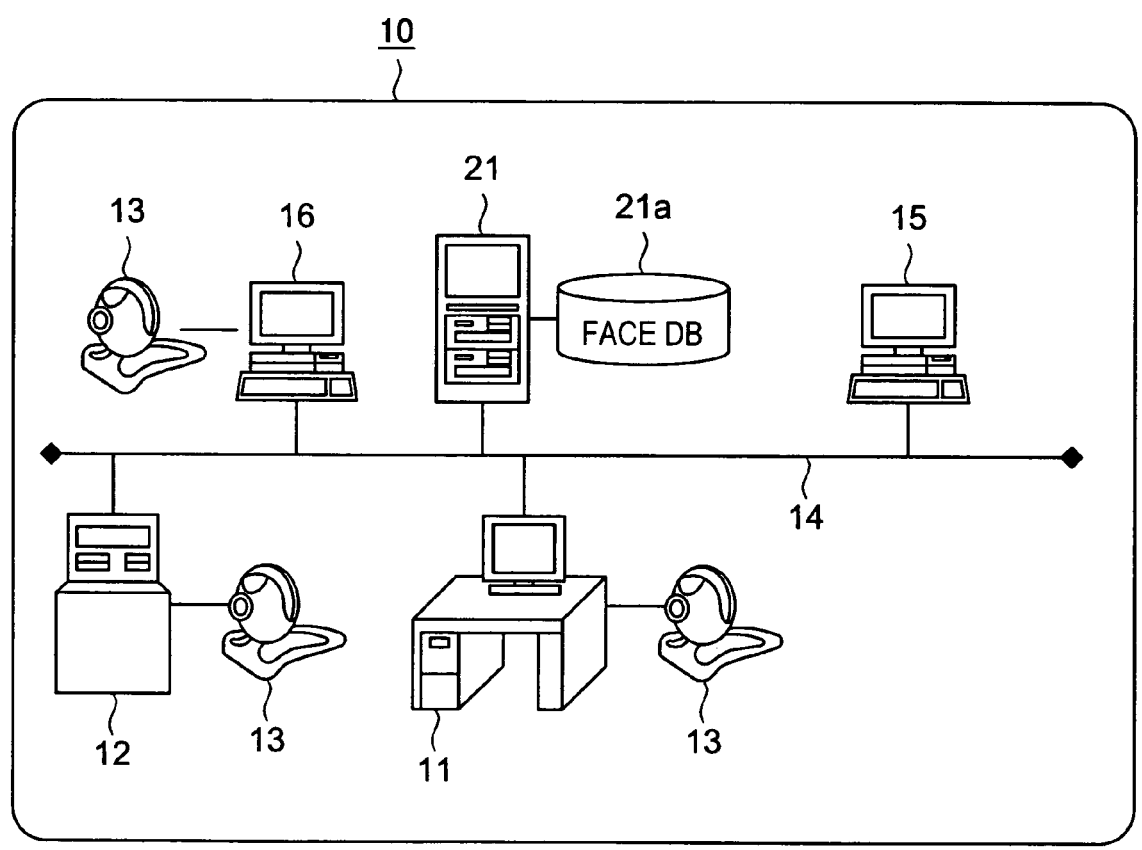
FIG. 12 is a schematic diagram showing a configuration of an identification system using face authentication in the fourth embodiment of the present invention.

FIG. 12 is a schematic diagram showing a configuration of an identification system using face authentication in the fourth embodiment of the present invention.

In this embodiment, when the clerk at the counter cannot achieve the identification of the customer 31 even by checking with eyes, such a person having more authority than the clerk as an officer including manager managing the clerk's operation performs the identification of the customer 31 by checking with eyes.

In this case, as shown in FIG. 12, an officer terminal 15 connected to the intraoffice network 14 is arranged at the office 10. The officer terminal 15 is a kind of computer arranged at an officer's desk and so on and comprises: an input part including an input device such as keyboard, mouse and touch panel; a display part including a display device such as CRT, liquid crystal display and LED display; an operation device such as CPU and MPU; a memory device such as magnetic disk and semiconductor memory; a communications interface; and so on. However, the camera 13 for obtaining the face image of the customer 31 is not connected thereto. The officer of the office 10 operates the officer terminal 15 to perform the identification of the customer 31 and has the registered face image displayed on the display part to perform the identification by checking with eyes. After that, the officer inputs an instruction for the clerk at the counter.

In an example shown in FIG. 12, although the face authentication server 21 to which the face database 21a is connected is arranged at the office 10 and connected to the intraoffice network 14, the face authentication server 21 may be arranged at the center 20 as in the first to third embodiments. In FIG. 12, there is comprised by a low counter terminal 16 as a counter terminal arranged at the counter such as a low counter and an inquiry counter of the office 10 and connected to the intraoffice network 14. The low counter terminal 16 is a kind of computer and comprises: an input part including an input device such as keyboard, mouse and touch panel; a display part including a display device such as CRT, liquid crystal display and LED display; an operation device such as CPU and MPU; a memory device such as magnetic disk and semiconductor memory; a communications interface; and so on. However, a function for achieving an account service is not included. The camera 13 for obtaining the face image of the customer 31 is connected thereto. The low counter terminal 16 can be omitted. In the first to third embodiments, the low counter terminal 16 can be arranged at the office 10 as required.

Next, an operation of the identification system using face authentication in this embodiment will be described.

Figure 13:
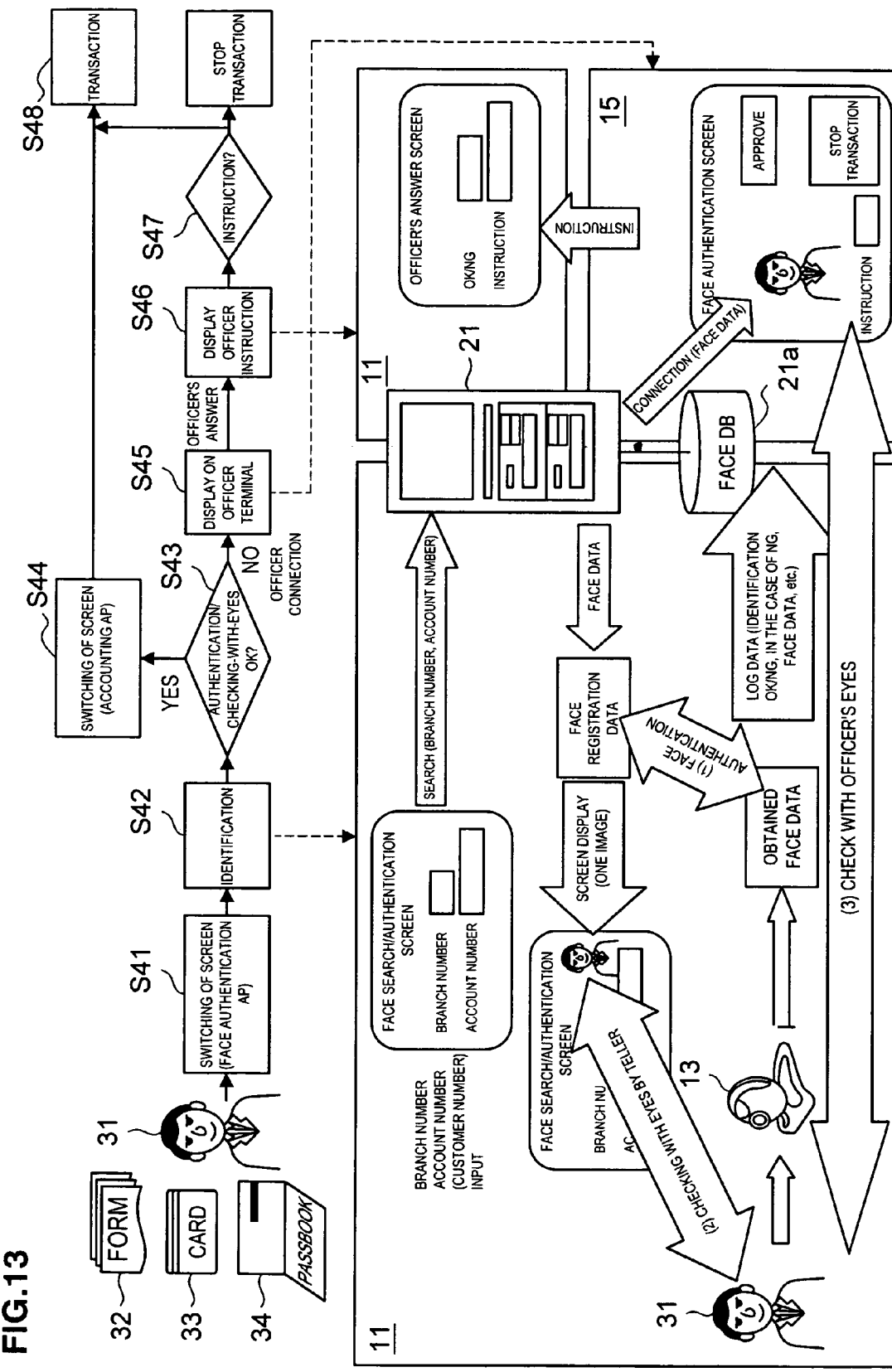
FIG. 13 is a diagram showing an operation of an identification system using face authentication in the fourth embodiment of the present invention.

FIG. 13 is a diagram showing an operation of an identification system using face authentication in the fourth embodiment of the present invention.

First, the customer 31 submits the form 32 with necessary information filled, the card 33 and the passbook 34 to the counter to request a transaction. Then the clerk at the counter operates the office terminal 11 to start up the face authentication application and a screen displayed on the display part of the office terminal 11 is switched to perform identification.

In the identification, the clerk at the counter inputs the branch number and the account number in the columns of branch number and account number in a face search/authentication screen displayed on the display part of the office terminal 11. A customer number may also be input. Then the face data stored in the face database 21*a* is searched based on the branch number and the account number or the customer number and the searched face data is sent to the office terminal 11, which performs (1) face authentication by using the face data based on the face image of the customer 31 obtained by the camera 13, i.e., the obtained face data and the searched face data, i.e., the face registration data. In this case, sequential identification is performed for about 10 seconds to improve recognition rate. And when the recognition rate exceeds a threshold value, the identification becomes OK. One face image included in the face registration data is displayed on the face search/authentication screen displayed on the display part of the office terminal 11 and the clerk at the counter performs identification of the customer 31 with eyes. In other words, (2) checking with eyes by teller is performed. The clerk at the counter inputs to the office terminal 11 whether the result of the check is OK or not. In this embodiment, the identification is achieved by (1) face authentication in conjunction with (2) checking with eyes by teller. The log data is stored in the face database 21*a* and includes identification OK or NG, and in the case of NG, includes face data as well.

Sequentially, it is judged whether the identification has been achieved by face authentication and checking with eyes or not, in other words, authentication/checking-with-eyes is OK or not. In the case of not being OK, (3) the officer checks with eyes according to an officer connection. In this case, the face image included in the face registration data is sent to the officer terminal 15 to be displayed on a face authentication screen of the display part of the officer terminal 15. Then the officer performs the identification of the customer 31 by checking with eyes.

The officer inputs an instruction in a column of instruction of the face authentication screen of the display part of the officer terminal 15. The instruction is about an approval of transaction or a stop of transaction. Then the instruction is displayed on an officer's answer screen displayed on the display part of the office terminal 11. In the case of the instruction about a stop of transaction, the transaction is stopped while in the case of approval, the transaction is performed. When authentication/checking-with-eyes is judged to be OK, the accounting application starts and a screen displayed on the display part of the office terminal 11 is switched to perform an ordinary accounting transaction.

The description of other operations, which are the same as in the first to third embodiments, will be omitted.

Next, steps in FIG. 13 will be described.

Step S41 The face authentication application starts to perform switching of the screen displayed on the display part of the office terminal 11.

Step S42 The identification is performed.

Step S43 It is judged whether authentication/checking-with-eyes is OK or not. In the case of authentication/checking-with-eyes being OK, there proceeds on to step S44 and in the case of authentication/checking-with-eyes not being OK, there proceeds on to step S45.

Step S44 The accounting application starts to perform switching of the screen displayed on the display part of the office terminal 11.

Step S45 The face image is displayed on the face authentication screen of the display part of the officer terminal 15.

Step S46 The officer inputs an instruction in a column of instruction of the face authentication screen of the display part of the officer terminal 15.

Step S47 It is judged whether the instruction is about an approval of transaction or a stop of transaction. In the case of approval, there proceeds on to step S48. In the case of stop of transaction, the transaction is stopped.

Step S48 An ordinary accounting transaction is performed.

In this embodiment, as described above, when the clerk at the counter cannot achieve the identification of the customer 31 even by checking with eyes, the officer performs the identification of the customer 31 by checking with eyes, which enhances authentication accuracy and reduces the load of the clerk at the counter.

Next, the fifth embodiment of the present invention will be described in reference to the accompanying drawings. The same reference numerals as in the first to fourth embodiments are attached to components having the same functions in following description and the accompanying drawings, and a description thereof is omitted.

Figure 14:
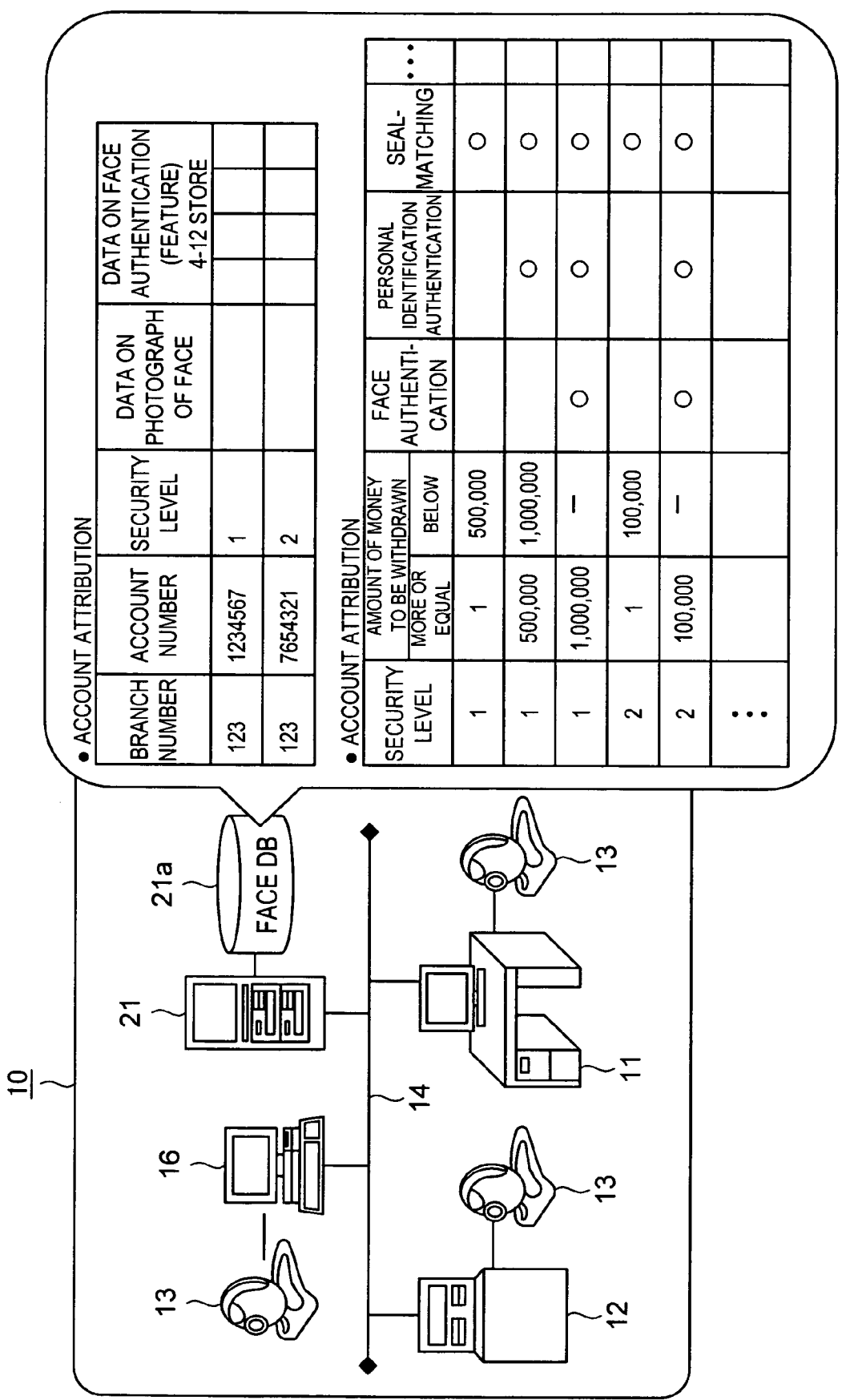
FIG. 14 is a schematic diagram showing a configuration of an identification system using face authentication in the fifth embodiment of the present invention.

FIG. 14 is a schematic diagram showing a configuration of an identification system using face authentication in the fifth embodiment of the present invention.

In this embodiment, a security level is set for each account, and a flow of process for identification is changed in accordance with the security level and by considering kind of account, amount of money to be withdrawn, balance of account, number of transaction per day and so on. Thereby security is ensured and paperwork in a financial institution is made more efficient.

In this case, as shown in FIG. 14, the security level of the data stored in the face database 21*a* is set for each account numerically. In the face database 21*a*, there is stored a table showing items of each security level, amount of money to be withdrawn, necessity of face authentication, necessity of personal identification authentication, necessity of matching a seal and so on.

Next, an operation of the identification system using face authentication in this embodiment will be described. First, description will be given about a case where the customer 31 performs a transaction such as withdrawal, account closure and notification including address change at the counter of office 10.

Figure 15:
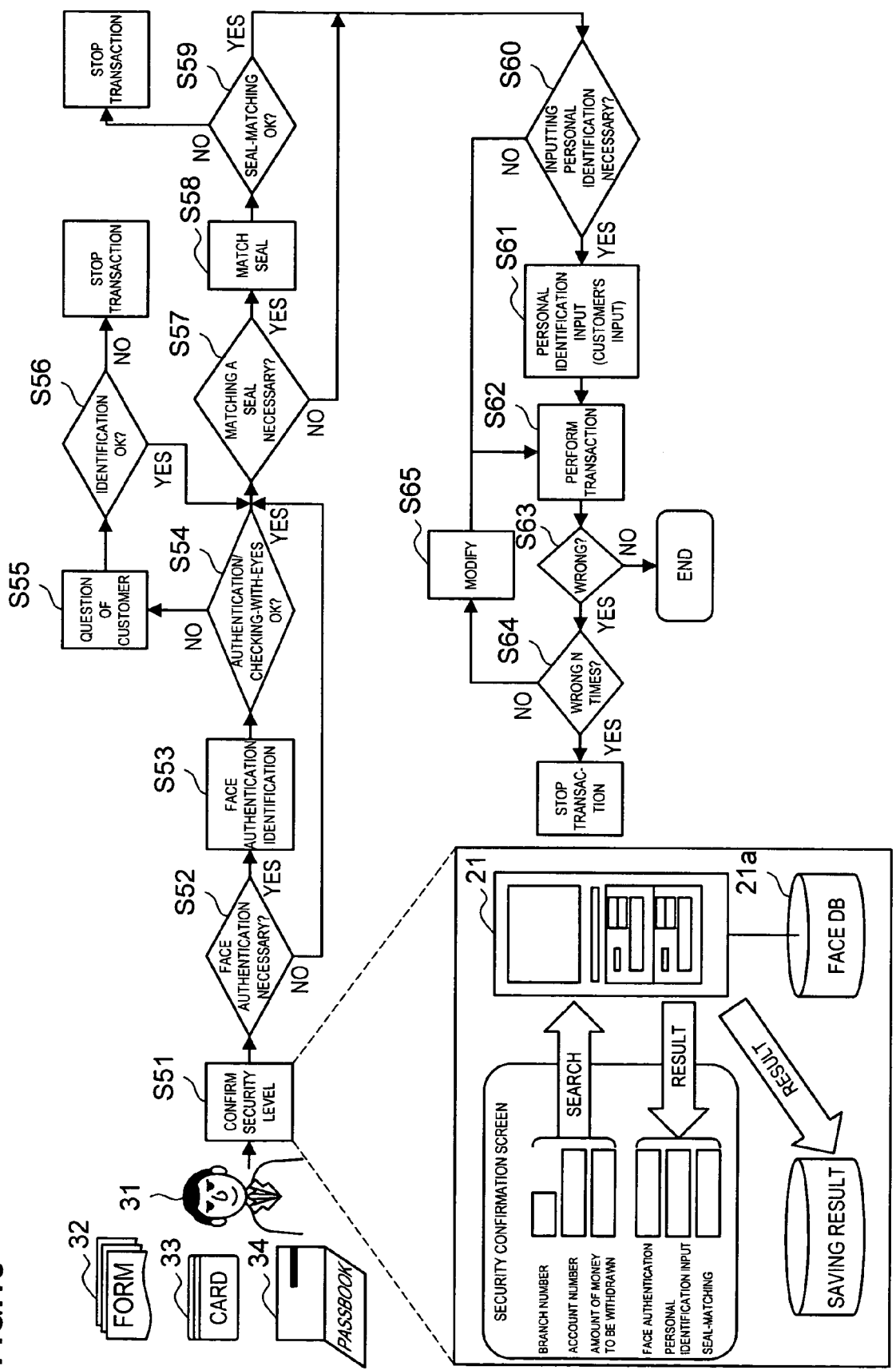
FIG. 15 is a first diagram showing an operation of an identification system using face authentication in the fifth embodiment of the present invention.

FIG. 15 is a first diagram showing an operation of an identification system using face authentication in the fifth embodiment of the present invention.

First, the customer 31 submits the form 32 with necessary information filled, the card 33 and the passbook 34 to the counter to request a transaction. When the clerk at the counter operates the office terminal 11, a security confirmation screen is displayed on the display part of the office terminal 11 and the security level is confirmed.

In the security level confirmation, the clerk at the counter inputs the branch number, the account number and an amount of money to be withdrawn in the columns of branch number, account number and amount of money to be withdrawn in the security confirmation screen displayed on the display part of the office terminal 11. Then the data stored in the face database 21a is searched based on the branch number, the account number and the amount of money to be withdrawn and the search result is sent to the office terminal 11. At the same time, the result is stored in a memory area for saving result set at the memory means of the office terminal 11 and so on. On the security confirmation screen, there are displayed necessity of face authentication, necessity of personal identification input and necessity of matching a seal.

Next, the necessity of face authentication is judged based on the search result. In the case of face authentication being necessary, the face application starts to perform switching of the screen displayed on the display part of the office terminal 11, and identification is performed. Then as described in the first embodiment, the identification is achieved by (1) face authentication in conjunction with (2) checking with eyes by teller.

Sequentially, it is judged whether the identification has been achieved by face authentication and checking with eyes or not, in other words, authentication/checking-with-eyes is OK or not. In the case of not being OK, the clerk at the counter asks a question of the customer 31 to identify an agent. Then it is judged whether the identification is OK or not, and in the case of not being OK, the transaction is stopped. In the case of OK, on the other hand, or authentication/checking-with-eyes being OK, and face authentication being unnecessary, the necessity of matching a seal is judged based on the search result. In the case of matching a seal being necessary, a screen displayed on the display part of the office terminal 11 is switched to perform matching a seal.

Sequentially, it is judged whether the seal-matching is OK or not. In the case of not being OK, the transaction is stopped. In the case of OK, it is judged whether it is necessary to input the personal identification based on the search result or not. In the case of being necessary, a screen displayed on the display part of the office terminal 11 is switched to perform inputting the personal identification. Inputting the personal identification including a personal identification number is performed by customer 31. After the input the transaction is performed. In the case of not being necessary, the transaction is performed without the input of the personal identification.

In the next, it is judged whether the input personal identification is wrong or not. In the case of not being wrong, the process ends after the transaction. In the case of being wrong, it is judged whether the number of wrong inputs has reached a predetermined number or not, in other words, the number is N times or not. In the case of N times, the transaction is stopped. In the case of not being N times, transaction is resumed after modification.

Next, steps in FIG. 15 will be described.

Step S51 The security level is confirmed.

Step S52 The necessity of face authentication is judged. In the case of face authentication being necessary, there proceeds on to step S53. In the case of not being necessary, there proceeds on to step S57.

Step S53 The identification is achieved by face authentication in conjunction with checking with eyes by teller.

Step S54 It is judged whether authentication/checking-with-eyes is OK or not. In the case of authentication/checking-with-eyes being OK, there proceeds on to step S57 and in the case of authentication/checking-with-eyes not being OK, there proceeds on to step S55.

Step S55 A question is asked of the customer 31 to identify an agent.

Step S56 It is judged whether the identification is OK or not, and in the case of OK, there proceeds on to step S57. In the case of not being OK, the transaction is stopped.

Step S57 The necessity of matching a seal is judged. In the case of matching a seal being necessary, there proceeds on to step S58.

Step S58 A seal is matched.

Step S59 It is judged whether the seal-matching is OK or not. In the case of OK, there proceeds on to step S60. In the case of not being OK, the transaction is stopped.

Step S60 It is judged whether it is necessary to input the personal identification or not. In the case of being necessary, there proceeds on to step S61. In the case of not being necessary, there proceeds on to step S62.

Step S61 The customer 31 inputs the personal identification.

Step S62 The transaction is performed.

Step S63 It is judged whether the input personal identification is wrong or not. In the case of being wrong, there proceeds on to step S64. In the case of not being wrong, the process ends after the transaction.

Step S64 It is judged whether the number of wrong inputs is N times or not. In the case of not being N times, there proceeds on to step S65. In the case of N times, the transaction is stopped.

Step S65 The input personal identification is modified.

Next, the case where the customer 31 operates the consumer transaction facility 12 to perform transaction such as withdrawal and transfer will be described.

Figure 16:
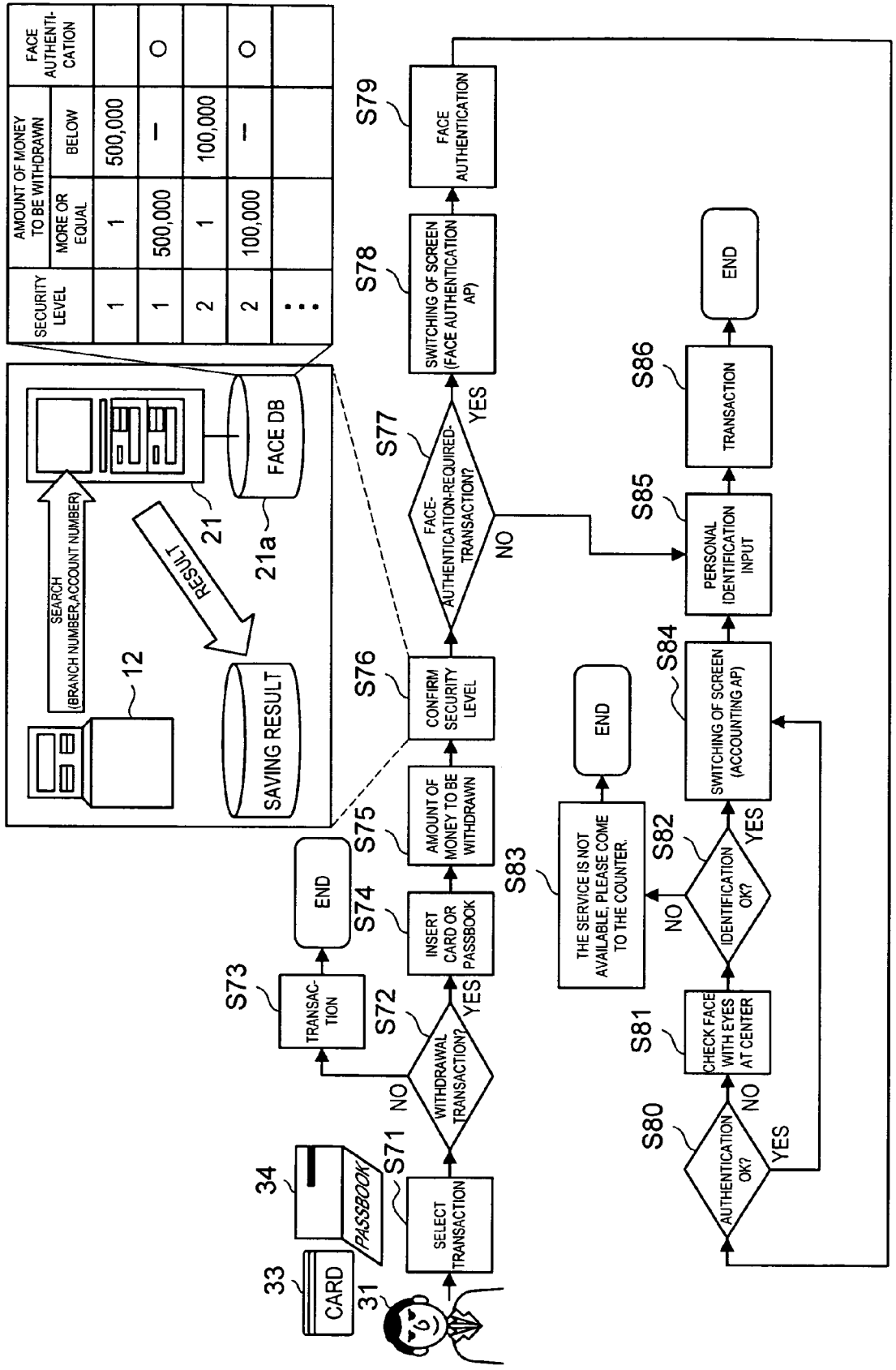
FIG. 16 is a second diagram showing an operation of an identification system using face authentication in the fifth embodiment of the present invention.

FIG. 16 is a second diagram showing an operation of an identification system using face authentication in the fifth embodiment of the present invention.

First, the customer 31 operates the consumer transaction facility 12 to select a transaction such as withdrawal and transfer. With this operation, it is judged whether the selected transaction is a withdrawal transaction or not. In the case of not being a withdrawal transaction, an ordinary accounting transaction is performed and the process ends. In the case of being a withdrawal transaction, the customer 31 inserts the card 33 or the passbook 34 into a card slot or a passbook slot of the consumer transaction facility 12 which are not shown in Figure. When the customer 31 inputs an amount of money to be withdrawn by operating the customer operation part, the security level is confirmed.

In the security level confirmation, the branch number, the account number and the amount of money to be withdrawn read out from the magnetic tapes of the card 33 or passbook 34 are sent to the face authentication server 21. Then the data stored in the face database 21a is searched based on the branch number, the account number and the amount of money to be withdrawn and the search result is sent to the consumer transaction facility 12. At the same time, the result is stored in a memory area for saving result set at the memory means of the consumer transaction facility 12 and so on.

Next, it is judged whether the transaction requires face authentication or not, in other words, face-authentication-required-transaction based on the search result or not. In the case of face-authentication-required-transaction, the face authentication application starts to perform switching of the screen displayed on the customer operation part of the consumer transaction facility 12, and face authentication is performed. Then as described in the first embodiment, (1) face authentication is performed.

Sequentially, it is judged whether the identification has been achieved by face authentication or not, in other words, authentication is OK or not. In the case of not being OK, the face is checked with eyes at the center 20. In this case, as described in the first embodiment, (2) checking with eyes is performed.

And sequentially, it is judged whether the identification has been achieved by checking with eyes or not, in other words, identification is OK or not. In the case of not being OK, a message "The service is not available, please come to the counter." is displayed on the customer operation part of the consumer transaction facility 12, and the transaction ends. In the case of OK, the accounting application starts to perform switching of the screen displayed on the customer operation part of the consumer transaction facility 12 to perform inputting the personal identification. In the case of not being face-authentication-required-transaction, the personal identification is input sequentially. Then an ordinary accounting transaction is performed and the process ends after the transaction.

Next, steps in FIG. 16 will be described.

Step S71 Transaction is selected.

Step S72 It is judged whether the selected transaction is a withdrawal transaction or not. In the case of withdrawal transaction, there proceeds on to step S74 and in the case of not being withdrawal transaction, there proceeds on to step S73.

Step S73 An ordinary accounting transaction is performed and the process ends.

Step S74 The card 33 or the passbook 34 is inserted.

Step S75 The amount of money to be withdrawn is input.

Step S76 The security level is confirmed.

Step S77 It is judged whether the selected transaction is a face-authentication-required-transaction or not. In the case of face-authentication-required-transaction, there proceeds on to step S78. In the case of not being necessary, there proceeds on to step S85.

Step S78 The face authentication application starts to perform switching of the screen displayed on the customer operation part of the consumer transaction facility 12.

Step S79 Face authentication is performed.

Step S80 It is judged whether the authentication is OK or not, and in the case of OK, there proceeds on to step S84. In the case of not being OK, there proceeds on to step S81.

Step S81 The face is checked with eyes at the center 20.

Step S82 It is judged whether the identification is OK or not. In the case of OK, there proceeds on to step S84. In the case of not being OK, there proceeds on to step S83.

Step S83 A message "The service is not available, please come to the counter." is displayed on the customer operation part of the consumer transaction facility 12, and the transaction ends.

Step S84 The accounting application starts to perform switching of the screen displayed on the customer operation part of the consumer transaction facility 12.

Step S85 The personal identification is input.

Step S86 An ordinary accounting transaction is performed and the process ends after the transaction.

In this embodiment, a security level is set for each account, and a flow of process for identification is changed in accordance with the security level and by considering kind of account, amount of money to be withdrawn, balance of account, number of transaction per day and so on. Thereby security is ensured and paperwork in a financial institution is made more efficient.

Next, the sixth embodiment of the present invention will be described in reference to the accompanying drawings. The same reference numerals as in the first to fifth embodiments are attached to components having the same functions in following description and the accompanying drawings, and a description thereof is omitted.

Figure 17:
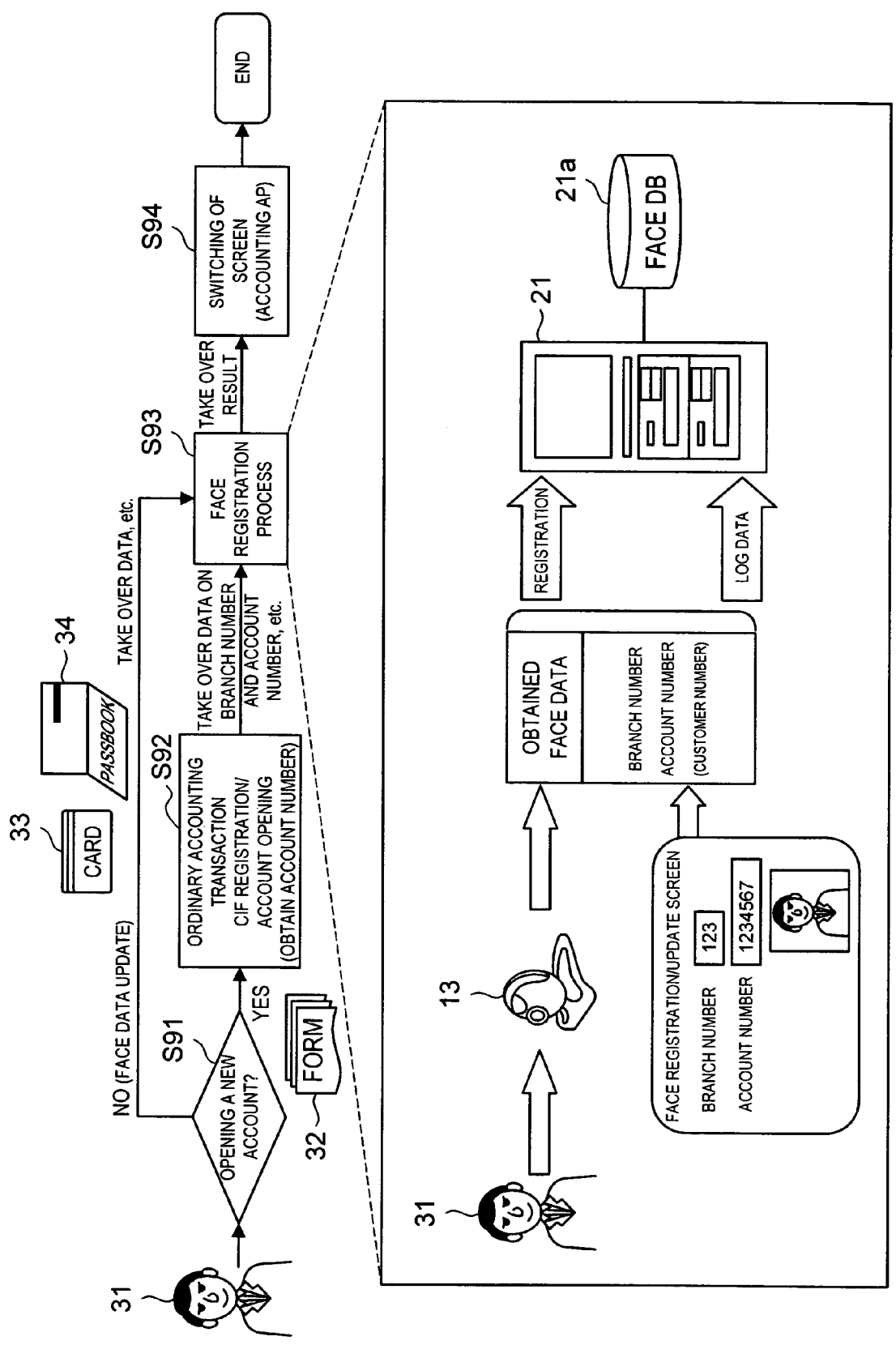
FIG. 17 is a first diagram showing an operation of an identification system using face authentication in the sixth embodiment of the present invention.

FIG. 17 is a first diagram showing an operation of an identification system using face authentication in the sixth embodiment of the present invention.

In this embodiment, since the face registration application, the face authentication application and so on which are loaded on the office terminal 11 operate with the accounting application, the data can be taken over and the trouble of data input can be saved. First, there will be described the operation in the case of opening a new account by a customer or updating face data.

In this case, when the customer 31 goes to the counter, it is judged whether the customer 31 will open a new account or not. In the case of opening, CIF (Customer Information File) registration is performed for an ordinary accounting transaction based on the contents written in the form 32 submitted by the customer 31 to open an account. Thereby the customer 31 obtains an account number. When the clerk at the counter operates the office terminal 11 to start up the face registration application and a screen displayed on the display part of the office terminal 11 is switched to perform face registration process. In this case, the data on the branch number, the account number and so on are taken over from the accounting application to the face registration application. In the case of not being opening a new account, a face registration process is performed to update face data. In this case, the data on the branch number and the account number read out from the magnetic stripes of the card 33 and passbook 34 and so on are taken over.

In the face registration process, the face of the customer 31 is photographed by the camera 13 connected to the office terminal 11 to obtain a face image. The data taken over is automatically input in the columns of branch number and account number in a face registration/update screen having displayed on the display part of the office terminal 11 by the clerk at the counter. A customer number may also be input. Then the face data based on the obtained face image, i.e., the obtained face data is correlated to the branch number and the account number or the customer number and registered by the face authentication server 21 to be stored in the face database 21a. The log data is also stored in the face database 21a. Note that one customer 31 is registered for one account, and the face data on one customer 31 includes a plurality of face images.

Next, the accounting application starts to perform switching of the screen displayed on the display part of the office terminal 11. In this case, the result of face registration process is automatically taken over, and after an ordinary accounting transaction, the process ends.

Next, steps in FIG. 17 will be described.

Step S91 It is judged whether the transaction at this time is opening a new account or updating face data. In the case of opening a new account, there proceeds on to step S92 and in the case of not opening a new account, there proceeds on to step S93.

Step S92 CIF registration is preformed for an ordinary accounting transaction to open an account. Thereby the customer 31 obtains an account number.

Step S93 The face registration process is performed.

Step S94 The accounting application starts to perform switching of the screen displayed on the display part of the office terminal 11. An ordinary accounting transaction is performed and the process ends.

Next, there will be described the case where the customer 31 performs a transaction such as withdrawal, account closure and notification including address change at the counter of office 10.

Figure 18:
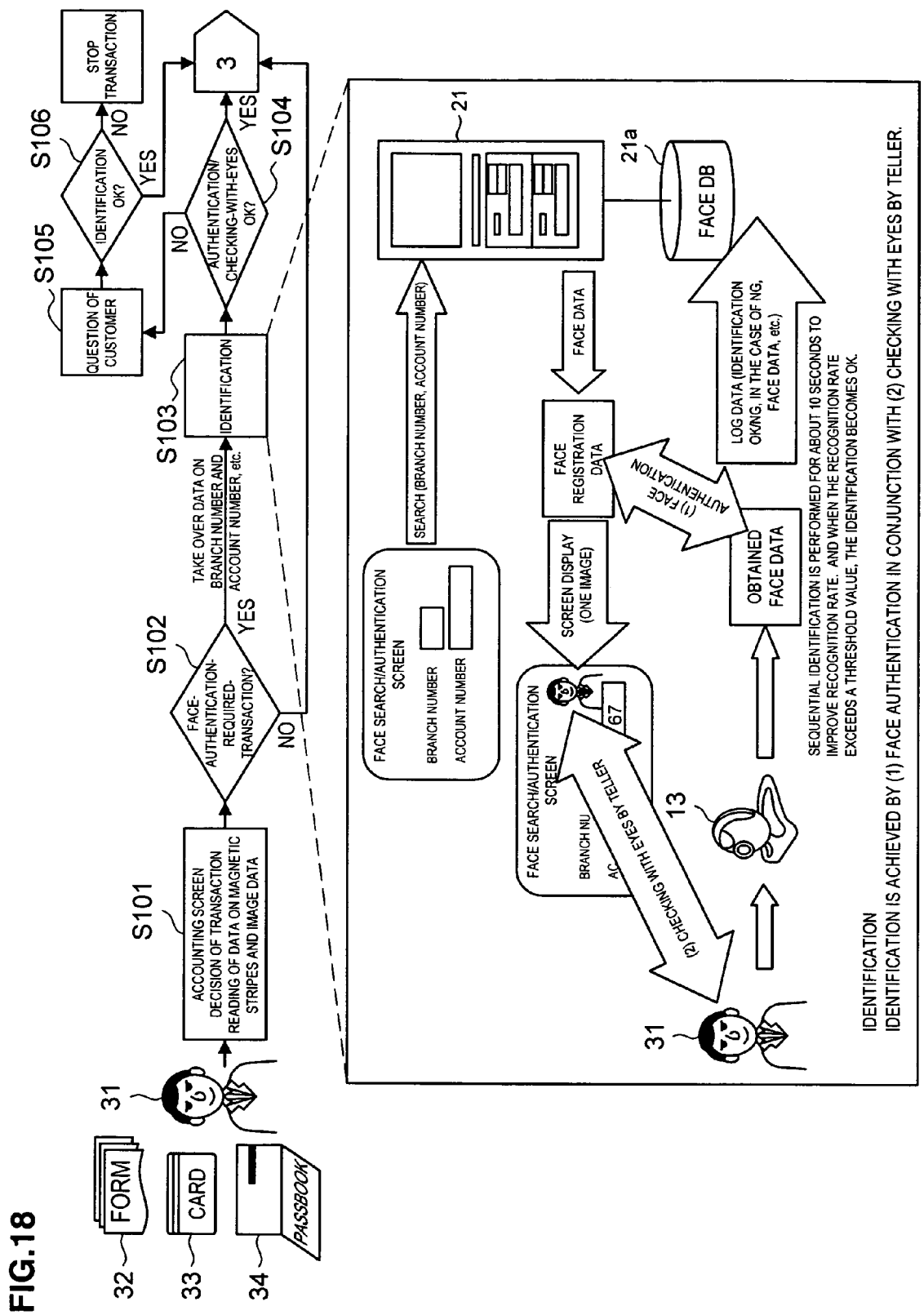
FIG. 18 is a second diagram showing an operation of an identification system using face authentication in the sixth embodiment of the present invention.
Figure 19:
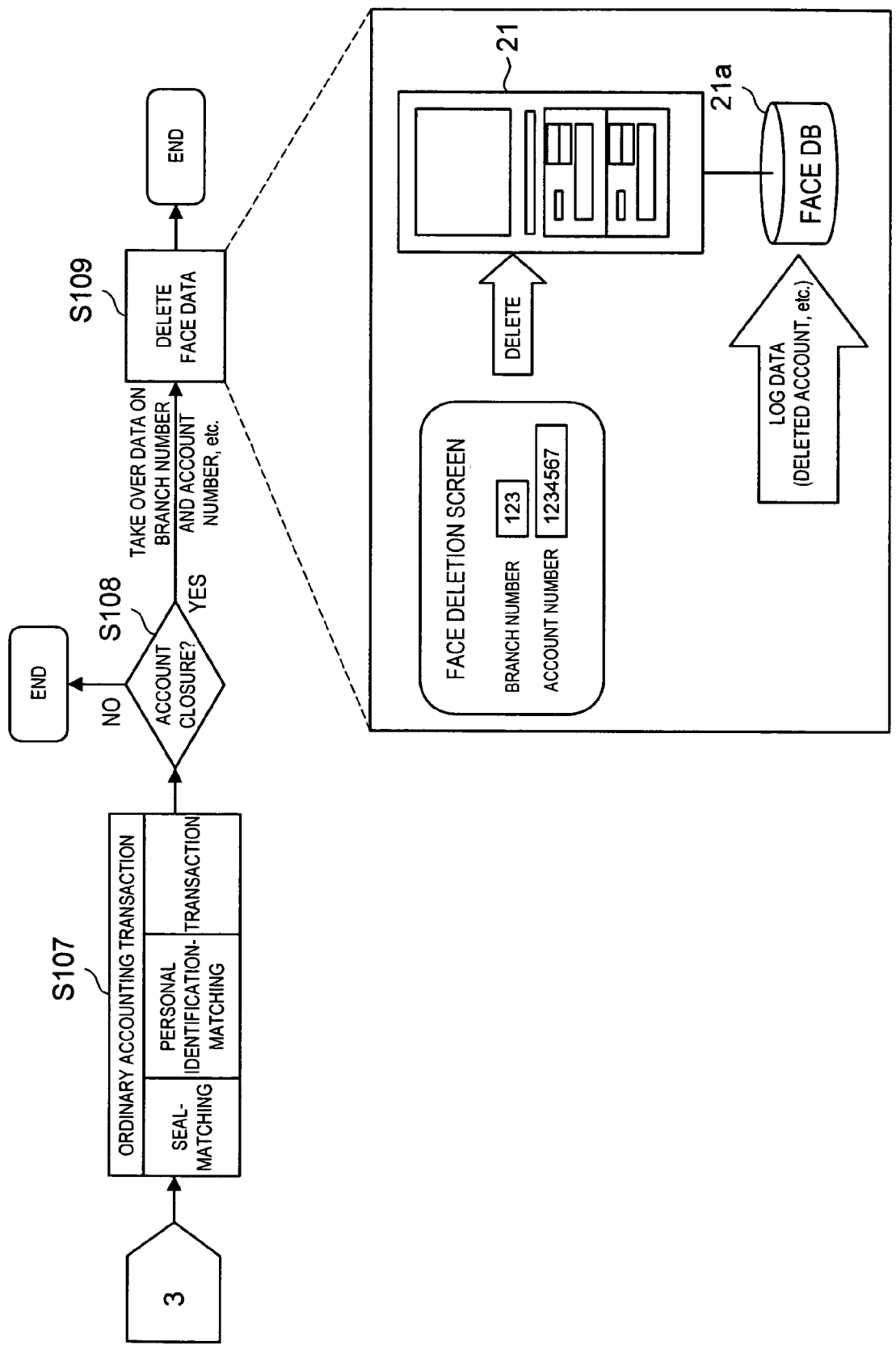
FIG. 19 is a third diagram showing an operation of an identification system using face authentication in the sixth embodiment of the present invention.

FIG. 18 is a second diagram showing an operation of an identification system using face authentication in the sixth embodiment of the present invention. FIG. 19 is a third diagram showing an operation of an identification system using face authentication in the sixth embodiment of the present invention.

First, the customer 31 submits the form 32 with necessary information filled, the card 33 and the passbook 34 to the counter to request a transaction. In this case, an accounting screen is displayed on the display part of the office terminal 11. The clerk at the counter performs decision of transaction and reading of data on the magnetic stripes of the card 33, the passbook 34 and so on and reading of image data. Next, it is judged whether the transaction requires face authentication or not, in other words, face-authentication-required-transaction based on a transaction database (not shown) or not. In the case of face-authentication-required-transaction, the face authentication application starts to perform switching of the screen displayed on the customer operation part of the consumer transaction facility 12, and identification is performed. In this case, data on branch number, account number and so on is taken over from the accounting application to the face authentication application.

In the identification, the data taken over is automatically input in the columns of branch number and account number in a face search/authentication screen having displayed on the display part of the office terminal 11 by the clerk at the counter. A customer number may also be input. Then the face data stored in the face database 21*a* is searched based on the branch number and the account number or the customer number and the searched face data is sent to the office terminal 11, which performs (1) face authentication by using the face data based on the face image of the customer 31 obtained by the camera 13, i.e., the obtained face data and the searched face data, i.e., the face registration data. In this case, sequential identification is performed for about 10 seconds to improve recognition rate. And when the recognition rate exceeds a threshold value, the identification becomes OK. One face image included in the face registration data is displayed on the face search/authentication screen displayed on the display part of the office terminal 11 and the clerk at the counter performs identification of the customer 31 by checking with eyes. In other words, (2) checking with eyes by teller is performed. In this embodiment, the identification is achieved by (1) face authentication in conjunction with (2) checking with eyes by teller. The log data is stored in the face database 21*a* and includes identification OK or NG, and in the case of NG, includes face data as well.

Sequentially, it is judged whether the identification has been achieved by face authentication and checking with eyes or not, in other words, authentication/checking-with-eyes is OK or not. In the case of not being OK, the clerk at the counter asks a question of the customer 31 to identify an agent. The clerk at the counter inputs to the office terminal 11 whether the identification is OK or not. Then it is judged whether the identification is OK or not, and in the case of not being OK, the transaction is stopped. In the case of OK, and authentication/checking-with-eyes being OK, on the other hand, the accounting application starts and a screen displayed on the display part of the office terminal 11 is switched to perform an ordinary accounting transaction. In the case of not being face-authentication-required-transaction, an ordinary accounting transaction is performed sequentially. In the accounting transaction, as heretofore, the transaction is performed after such a checking as matching a seal and personal identification checking including checking a personal identification number.

Next, it is judged whether the transaction at this time is account closure or not, and in the case of not being account closure, the transaction ends. In the case of account closure, the face data is deleted after switching the screen displayed on the customer operation part of the consumer transaction facility 12. In this case, data on branch number, account number and so on is taken over from the accounting application to the face registration application. In this deletion, the data taken over is automatically input in the columns of branch number and account number in a face deletion screen having displayed on the display part of the office terminal 11 by the clerk at the counter. Then the face data stored in the face database 21*a* is deleted based on the branch number and the account number by the face authentication server 21. The log data is stored in the face database 21*a* and includes the data on the deleted account. After the face data deletion, the transaction ends.

Next, steps in FIGS. 18 and 19 will be described.

Step S101 The clerk at the counter performs decision of transaction and reading of data on the magnetic stripes of the card 33, the passbook 34 and so on and reading of image data on the accounting screen.

Step S102 It is judged whether the selected transaction is a face-authentication-required-transaction or not. In the case of face-authentication-required-transaction, there proceeds on to step S103. In the case of not being face-authentication-required-transaction, there proceeds on to step S107.

Step S103 The identification is performed.

Step S104 It is judged whether authentication/checking-with-eyes is OK or not. In the case of authentication/checking-with-eyes being OK, there proceeds on to step S107 and in the case of authentication/checking-with-eyes not being OK, there proceeds on to step S105.

Step S105 A question is asked of the customer 31 to identify an agent.

Step S106 It is judged whether the identification is OK or not, and in the case of OK, there proceeds on to step S107. In the case of not being OK, the transaction is stopped.

Step S107 An ordinary accounting transaction is performed.

Step S108 It is judged whether the transaction at this time is account closure or not, and in the case of account closure, there proceeds on to step S109. In the case of not being account closure, the transaction ends.

Step S109 The face data is deleted to finish the process.

In this embodiment, since software for face registration and face authentication such as the face registration application, the face authentication application and so on which are loaded on the office terminal 11 operate with the accounting application, the data can be taken over between applications and the trouble of data input can be saved.

Next, the seventh embodiment of the present invention will be described in reference to the accompanying drawings. The same reference numerals as in the first to sixth embodiments are attached to components having the same functions in following description and the accompanying drawings, and a description thereof is omitted.

Figure 20:
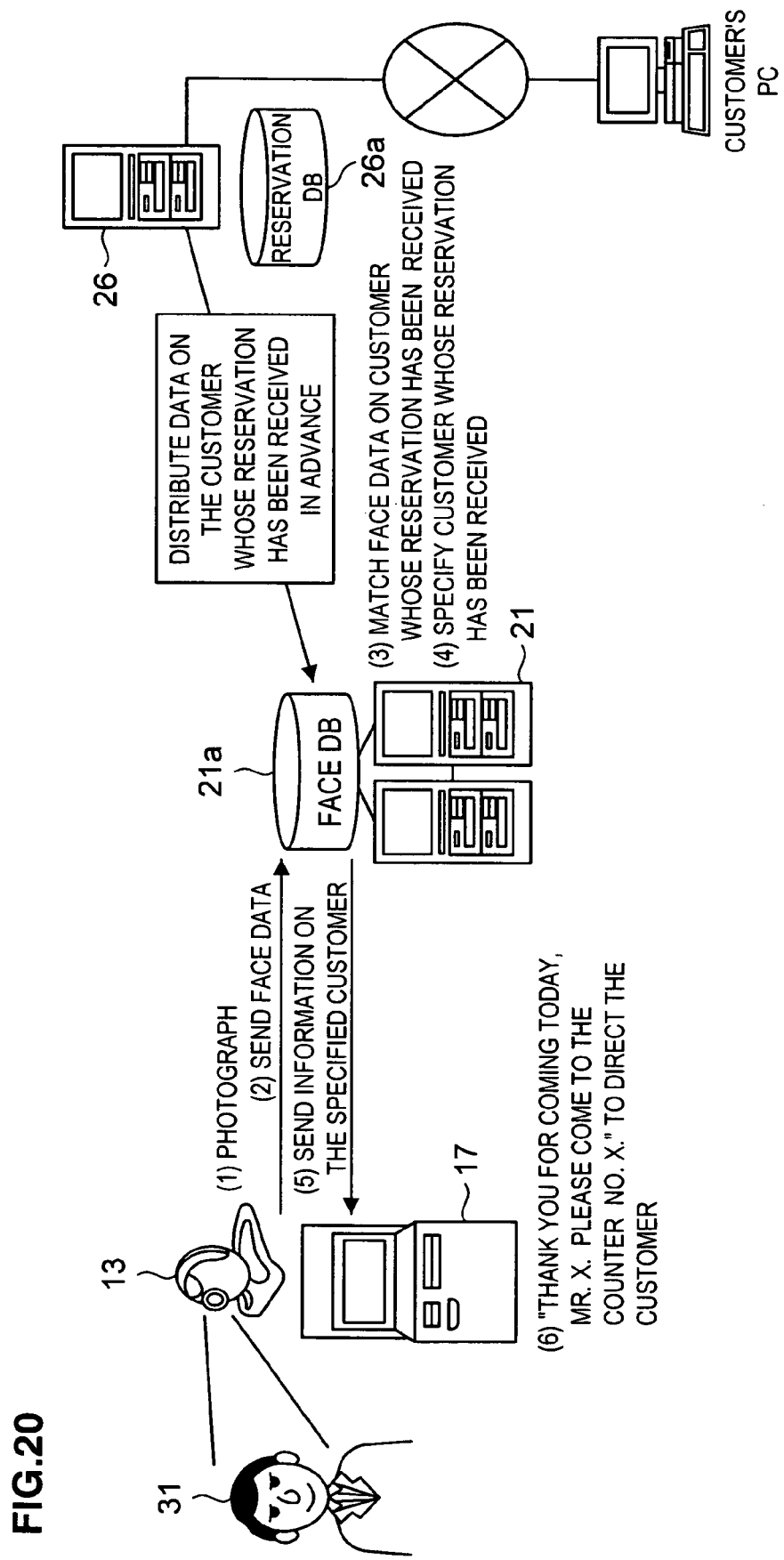
FIG. 20 is a first schematic diagram showing a configuration of an identification system using face authentication in the seventh embodiment of the present invention.
Figure 21:
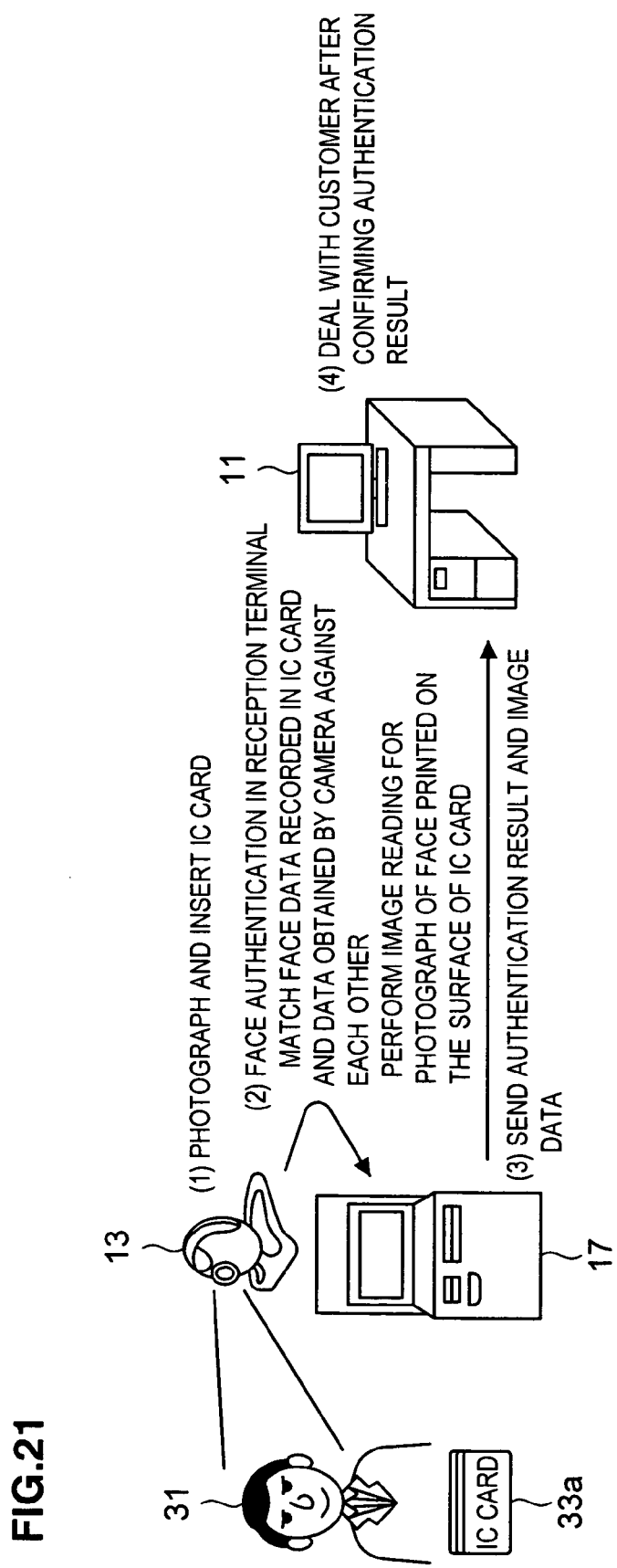
FIG. 21 is a second schematic diagram showing a configuration of an identification system using face authentication in the seventh embodiment of the present invention.

FIG. 20 is a first schematic diagram showing a configuration of an identification system using face authentication in the seventh embodiment of the present invention. FIG. 21 is a second schematic diagram showing a configuration of an identification system using face authentication in the seventh embodiment of the present invention.

In this embodiment, operating with a reception terminal makes it possible to improve a service for the customer 31 and improve security.

In this case, as shown in FIG. 20, a reception terminal 17 is arranged at the office 10. The reception terminal 17 is a kind of computer arranged near the entrance of the office 10 and comprises: an operation device such as CPU and MPU; a memory device such as magnetic disk and semiconductor memory; an input device such as keyboard and touch panel; a display device such as CRT and liquid crystal display; a voice output system such as speaker; a communications interface; a ticket issuing machine for issuing a number ticket; and so on. When the customer coming to the counter at the office 10 operates the reception terminal 17 on his/her own to input his/her business, address, name and so on, there are output the corresponding counter number, a reception number for the customer 31, expected waiting time and so on from the display device, the voice output system, the ticket issuing machine and so on. In this embodiment, the reception terminal 17 is loaded with the camera 13 connected to the face authentication server 21. It is desirable for the camera 13 to be incorporated in the reception terminal 17.

In FIG. 20, there is comprised by a reception server 26 comprising: an operation means such as CPU and MPU; a memory means such as magnetic disk and semiconductor memory; a communications interface; and so on and operating according to a program to perform a service of registration by receiving a reservation by the customer 31. A reservation database 26a for storing various data on the registered reservation is connected to the reception server 26, which is connected to the face authentication server 21.

First, the customer 31 makes a reservation for transaction at the counter of the office 10 via Web access from his/her PC at home or mobile terminal. Then the reservation by the customer 31 is received at the reception server 26 and registered, and the data on reservation is stored in the reservation database 26a. The reception server 26 distributes the data on the customer 31 whose reservation has been received to the face authentication server 21 in advance.

On the date and time reserved, when the customer 31 goes to the office 10 and approaches the reception terminal 17, the camera 13 at the reception terminal 17 photographs the customer 31 (FIG. 20(1)) and the face data on the customer 31 is sent to the face authentication server 21 (FIG. 20(2)). Then the face authentication server 21 matches the face data received from the reception terminal 17 and the face data on the customer 31 whose reservation has been received against each other (FIG. 20(3)) to specify the customer 31 whose reservation has been received (FIG. 20(4)). Information on the specified customer 31 is sent to the reception terminal 17 (FIG. 20(5)). The reception terminal 17 outputs voice saying "Thank you for coming today, Mr. X. Please come to the counter No. X." to direct the customer 31 to a specific counter (FIG. 20(6)).

As described above, the customer having made a reservation at the counter at the office 10 in advance is directed to the counter without specific operation on his/her side, which can improve a service for the customer 31.

For the customer 31 who did not make a reservation of a transaction at the counter at the office 10, face authentication at the reception terminal 17 can improve security. In this case as shown in FIG. 21, the reception terminal 17 is connected to the office terminal 11. The customer 31 is assumed to hold an IC card 33a as a card. The IC card 33a has a photograph of face printed on the surface thereof and face data stored in the memory means. When the customer 31 operates the reception terminal 17 to be accepted, the camera 13 at the reception terminal 17 photographs the customer 31. When the customer 31 inserts the IC card 33a in a card slot (not shown) (FIG. 21(1)), the face data stored in the memory means of the IC card 33a is obtained. The reception terminal 17 matches the face data based on the face image of the customer 31 obtained by the camera 13 and the face data stored in the memory means of the IC card 33a against each other to perform face authentication. Image reading is also performed for the photograph of face printed on the surface of the IC card 33a (FIG. 21(2)). The authentication result and the image data on the photograph of face are sent from the reception terminal 17 to the office terminal 11 (FIG. 21(3)).

Thereby the clerk at the counter can deal with the customer 31 more appropriately after confirming the authentication result (FIG. 21(4)). In the case of authentication result being NG, the clerk at the counter checks with eyes.

In this embodiment, operating with the reception terminal 17 for face authentication makes it possible to improve a service for the customer 31 and improve security.

Next, the eighth embodiment of the present invention will be described in reference to the accompanying drawings. The same reference numerals as in the first to seventh embodiments are attached to components having the same functions in following description and the accompanying drawings, and a description thereof is omitted.

Figure 22:
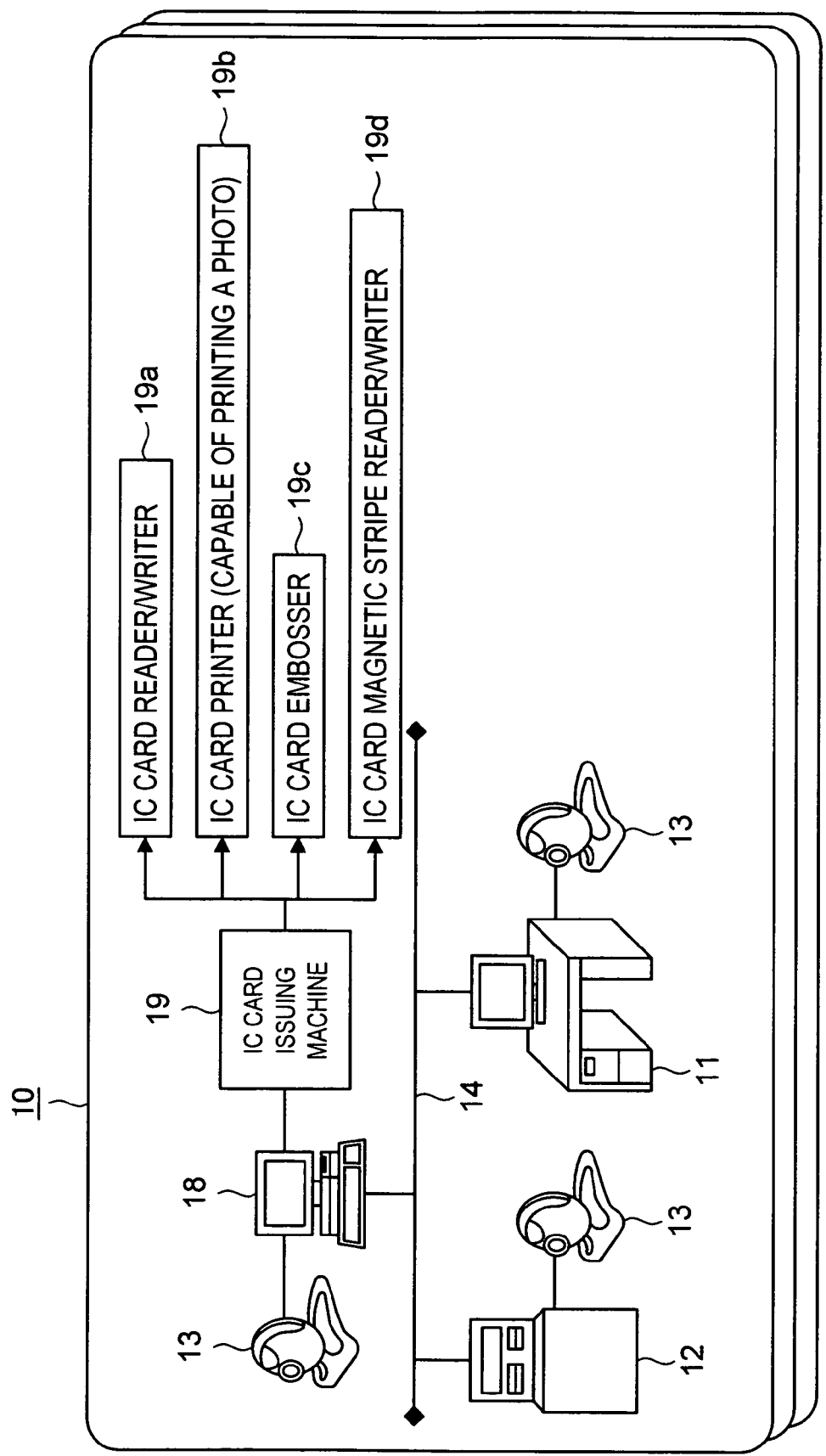
FIG. 22 is a schematic diagram showing a configuration of an identification system using face authentication in the eighth embodiment of the present invention.

FIG. 22 is a schematic diagram showing a configuration of an identification system using face authentication in the eighth embodiment of the present invention.

In this embodiment, the IC card 33a for storing the face data on the customer 31 in the memory means is issued as a cash card, which allows omitting the face authentication server 21 to which the face database 21a is connected.

In this case, as shown in FIG. 22, an account-opening terminal 18 as a counter terminal connected to the intraoffice network 14 is arranged at the office 10. The account opening terminal 18 is a kind of computer and comprises: an input part including an input device such as keyboard, mouse and touch panel; a display part including a display device such as CRT, liquid crystal display and LED display; an operation device such as CPU and MPU; a memory device such as magnetic disk and semiconductor memory; a communications interface; and so on. The camera 13 for obtaining the face image of the customer 31 is also connected thereto. To the account opening terminal 18, further, an IC card-issuing machine 19 for issuing the IC card 33a is connected. The IC card issuing machine 19 comprises: an IC card reader/writer 19a; an IC card printer 19b capable of printing a photo; an IC card embosser 19c; and an IC card magnetic stripe reader/writer 19d. The office terminal 11 and the consumer transaction facility 12 can deal with the IC card 33a.

Next, the operation of the identification system using face authentication in this embodiment will be described. First, there will be described the operation in the case of opening a new account by the customer 31 or updating face data.

FIG. 23 is a diagram showing an operation of an identification system using face authentication in the eighth embodiment of the present invention.

First, the customer 31 submits the form 32 with necessary information filled to the counter to apply for an account opening transaction. Then the clerk at the counter operates the account-opening terminal 18 to start up the face registration application and a screen displayed on the display part of the account-opening terminal 18 is switched to perform an IC card issue/update process.

In the IC card issue/update process, the face of the customer 31 is photographed by the camera 13 connected to the account-opening terminal 18 to obtain a face image. The clerk at the counter inputs the branch number and the account number in the columns of branch number and account number in a cash card/face registration screen displayed on the display part of the account opening terminal 18. Then the face data based on the obtained face image, i.e., the obtained face data and cash card data including the branch number and the account number are registered. In this case, the obtained face data and the cash card data are stored in an IC as the memory means of the IC card 33*a*. In the IC, a cash card function, face authentication data and data on photograph of face are stored. The obtained face data is converted to JPEG (Joint Photographic Expert Group) format to be printed on the surface of the IC card 33*a* by the IC card printer 19*b*. When printing a photograph of face on an IC card, use of electronic ink eliminates the necessity of issuing a new card in the update of photograph of face, in which it is effective since only a photograph of face is reprinted to reuse the card.

Next, it is judged whether the transaction at this time is opening a new account or updating face data. In the case of updating face data, the process ends. In the case of opening a new account, the accounting application starts to perform switching of the screen displayed on the display part of the account opening terminal 18, and after an ordinary accounting transaction, the process ends.

Next, steps in FIG. 23 will be described.

Step S111 The face registration application starts to perform switching of the screen displayed on the display part of the account opening terminal 18.

Step S112 The IC card issue/update process is performed.

Step S113 It is judged whether the transaction at this time is opening a new account or updating face data. In the case of opening a new account, there proceeds on to step S114 and in the case of updating face data, the process ends.

Step S114 The accounting application starts to perform switching of the screen displayed on the display part of the account opening terminal 18.

Step S115 An ordinary accounting transaction is performed and the process ends.

In this embodiment, as described above, the IC card 33*a* for storing face data on the customer 31 in the memory means is issued as a cash card, which allows to omit the face authentication server 21 to which the face database 21*a* is connected and makes the system configuration simple.

Although the preferred embodiment of the present invention has been described referring to the accompanying drawings, the present invention is not restricted to such examples. It is evident to those skilled in the art that the present invention may be modified or changed within a technical philosophy thereof and it is understood that naturally these belong to the technical philosophy of the present invention.

What is claimed is:

1. An identification system using face authentication comprising:
   a counter terminal arranged at a counter of a financial institution and including a camera for obtaining a customer's face image;
   a face authentication server connected to the counter terminal and including a face database for storing a registered face data of the customer;
   an officer terminal operated by an officer of the financial institution; and
   wherein the counter terminal performs face authentication by using face data based on the customer's face image obtained by the camera and using the registered face data of the customer and allows to check with eyes by displaying the registered face data of the customer, and upon a successful authentication, an accounting application screen is displayed and accounting processing is executed,
   wherein the counter terminal performs face authentication operating with the accounting application, wherein during a teller transaction, the accounting application is initiated to allow entry of account information, and if face authentication is necessary, a face authentication application is initiated, data indicating the account information are sent from the accounting application to the face authentication application, and the transferred data are automatically entered into an input field,
   wherein checking with eyes is allowed by displaying the face data based on the customer's face image obtained by the camera on the officer terminal when an identification cannot be performed, and
   wherein based upon results of a visual verification performed at the officer terminal, the officer enters a transaction approval instruction or a transaction denial instruction, and if a transaction approval instruction is entered, the accounting application screen is displayed at the counter terminal.

2. An identification system using face authentication according to claim 1 wherein the registered face data of the customer is automatically updated by using the face image obtained via the camera if a specific condition arises during a transaction.

3. An identification system using face authentication according to claim 1 wherein the counter terminal performs face authentication operating with a reception terminal, wherein upon arriving at a branch of the financial institution, face data of the customer are obtained at the reception terminal, the obtained face data are transmitted to the face authentication server to be compared with registered face data to identify the customer, and the reception terminal then outputs a guidance message corresponding to information on an identified customer.

4. An identification system using face authentication according to claim 1 wherein if the customer is conducting a transaction in order to close an account, a face registration application is initiated upon completion of the transaction, data indicating account information are transferred from the accounting application to the face registration application, and the face data corresponding to the customer are deleted.

5. An identification system using face authentication comprising:
   a consumer transaction facility including a camera for obtaining a customer's face image of a financial institution;
   a face authentication server connected to the consumer transaction facility and including a face database for storing a registered face data of the customer;
   a management terminal connected to the consumer transaction facility and the face authentication server; and
   an officer terminal operated by an officer of the financial institution, wherein the consumer transaction facility performs face authentication by using face data based on the customer's face image obtained by the camera and using the registered face data of the customer and allows to check with eyes by displaying the face data based on the customer's face image obtained by the camera and the registered face data of the customer on the management terminal when an identification cannot be performed, wherein if a transaction requires face authentication, a face authentication application is initiated at the consumer transaction facility, and if visual verification performed at the management terminal is successful, an accounting transaction screen is displayed at the consumer transaction facility, wherein checking with eyes is allowed by displaying the face data based on the customer's face image obtained by the camera on the officer terminal when an identification cannot be performed, and wherein based upon results of a visual verification performed at the officer terminal, the officer enters a transaction approval instruction or a transaction denial instruction, and if a transaction approval instruction is entered, the accounting transaction screen is displayed at the consumer transaction facility.

6. An identification system using face authentication according to claim 5 wherein the registered face data of the customer is automatically updated by using the face image obtained via the camera if a specific condition arises during a transaction.

7. An identification system using face authentication according to claim 5 wherein if the customer is conducting a transaction in order to close an account, the face registration application is initiated upon completion of the transaction, data indicating account information are transferred from the accounting application to the face registration application, and the face data corresponding to the customer are deleted.

8. A consumer transaction facility operated by a customer of a financial institution, comprising:
   a camera for obtaining a face image of the customer; and
   an officer terminal operated by an officer of the financial institution, and wherein:
   the consumer transaction facility is connected to a face authentication server including a face database for storing a registered face data of the customer and to a management terminal; and
   the consumer transaction facility performs an identification using face authentication by using face data based on the customer's face image obtained by the camera and using the registered face data of the customer and allows to check with eyes by displaying the face data based on the customer's face image obtained by the camera and the registered face data of the customer on the management terminal when an identification cannot be performed,
   wherein if a transaction requires face authentication, a face authentication application is initiated at the consumer transaction facility, and if visual verification performed at the management terminal is successful, an accounting transaction screen is displayed at the consumer transaction facility,
   wherein checking with eyes is allowed by displaying the face data based on the customer's face image obtained by the camera on the officer terminal when an identification cannot be performed, and
   wherein based upon results of a visual verification performed at the officer terminal, the officer enters a transaction approval instruction or a transaction denial instruction, and if a transaction approval instruction is entered, the accounting transaction screen is displayed at the consumer transaction facility.

9. A consumer transaction facility according to claim 8 wherein the registered face data of the customer is automatically updated by using the face image obtained via the camera if a specific condition arises during a transaction.

10. A consumer transaction facility according to claim 8 wherein if the customer is conducting a transaction in order to close an account, the face registration application is initiated upon completion of the transaction, data indicating account information are transferred from the accounting application to the face registration application, and the face data corresponding to the customer are deleted.

11. An identification system using face authentication according to claim 1 wherein during a teller transaction, a teller terminal executes a face authentication by comparing a face image obtained via a camera with a registered face image extracted from the face database and also displays the registered face image at the teller terminal so as to allow an operator to visually verify the customer, and the authentication is deemed successful if both the face authentication and the visual verification indicate approval.

12. An identification system using face authentication according to claim 2 wherein the specific condition occurs when the face authentication is successful, when both the face authentication and a visual verification are successful, or when the face authentication is not successful but a teller visual authentication is successful.

13. An identification system using face authentication according to claim 5 wherein during a teller transaction, a teller terminal executes a face authentication by comparing a face image obtained via a camera with a registered face image extracted from the face database and also displays the registered face image at the teller terminal so as to allow an operator to visually verify the customer, and the authentication is deemed successful if both the face authentication and the visual verification indicate approval.

14. An identification system using face authentication according to claim 6 wherein the specific condition occurs when the face authentication is successful, when both the face authentication and a visual verification are successful, or when the face authentication is not successful but a teller visual authentication is successful.

15. A consumer transaction facility according to claim 8 wherein during a teller transaction, a teller terminal executes a face authentication by comparing a face image obtained via a camera with a registered face image extracted from the face database and also displays the registered face image at the teller terminal so as to allow an operator to visually verify the customer, and the authentication is deemed successful if both the face authentication and the visual verification indicate approval.

16. A consumer transaction facility according to claim 9 wherein the specific condition occurs when the face authentication is successful, when both the face authentication and a visual verification are successful, or when the face authentication is not successful but a teller visual authentication is successful.

* * * * *